US012705669B2

(12) United States Patent
Swett et al.

(10) Patent No.: US 12,705,669 B2
(45) Date of Patent: Aug. 11, 2026

(54) MERCHANT MENUS ACCESSIBLE TO CUSTOMER DEVICES VIA MERCHANT-MANAGED IDENTIFIERS

(71) Applicant: Block, Inc., Oakland, CA (US)

(72) Inventors: Katherine Swett, Mount Pleasant, SC (US); Drew Richards, Brooklyn, NY (US); Xuanhua Ren, San Francisco, CA (US); Vitaly Odemchuk, Brookhaven, GA (US); Katherine Ahn, New York, NY (US); David Pearson, San Francisco, CA (US); Lisa Fong, Hayward, CA (US); Neil Straghalis, San Francisco, CA (US)

(73) Assignee: Block, Inc., Oakland, CA (US)

( * ) Notice: Subject to any disclaimer, the term of this patent is extended or adjusted under 35 U.S.C. 154(b) by 77 days.

(21) Appl. No.: 18/433,715

(22) Filed: Feb. 6, 2024

(65) Prior Publication Data

US 2024/0212032 A1 Jun. 27, 2024

Related U.S. Application Data

(63) Continuation of application No. 16/998,921, filed on Aug. 20, 2020, now Pat. No. 11,928,724.

(51) Int. Cl.
*G06Q 30/00* (2023.01)
*G06F 16/954* (2019.01)
(Continued)

(52) U.S. Cl.
CPC ....... *G06Q 30/0643* (2013.01); *G06F 16/954* (2019.01); *G06Q 20/102* (2013.01); *G06Q 30/0641* (2013.01)

(58) Field of Classification Search
CPC .................................................. G06Q 30/0643
See application file for complete search history.

(56) References Cited

U.S. PATENT DOCUMENTS 11,216,292 B2 1/2022 Accame et al.
11,321,420 B1 5/2022 Fregly et al.
(Continued)

FOREIGN PATENT DOCUMENTS

JP 2003-281244 A 10/2003
JP 2019-121034 A 7/2019
(Continued)

OTHER PUBLICATIONS

Intal, Grace Lorraine, et al. "Restaurant information system (RIS) with QR code to improve service operations of casual fine dining restaurant." 2020 IEEE 7th International Conference on Industrial Engineering and Applications (ICIEA). IEEE, 2020.*
(Continued)

*Primary Examiner* — Kathleen Palavecino
(74) *Attorney, Agent, or Firm* — Lee & Hayes, P.C.

(57) ABSTRACT

A first identifier associated with a brick-and-mortar store of a merchant and a second identifier associated with a designated physical area within the brick-and-mortar store can be accessed to generate a third identifier that is an identification code scannable by a computing device of a customer. The identification code can be received from the computing device of the customer and a menu of items associated with the merchant can be caused to be presented via the computing device of the customer. An indication of an order for an item of the menu of items associated with the third identifier is received from the computing device of the customer. Payment data associated with a payment instrument of the customer is received from the computing device of the customer, and payment for the order of the item is processed based at least in part on the payment data.

20 Claims, 14 Drawing Sheets

(51) Int. Cl.
*G06Q 20/10* (2012.01)
*G06Q 30/0601* (2023.01)

(56) References Cited

U.S. PATENT DOCUMENTS

| | | | | |
|---|---|---|---|---|
| 2004/0199541 | A1 | 10/2004 | Goldberg et al. | |
| 2006/0085265 | A1 | 4/2006 | Dietz et al. | |
| 2011/0307387 | A1 | 12/2011 | Francia | |
| 2012/0173351 | A1 | 7/2012 | Jaray et al. | |
| 2013/0138518 | A1 | 5/2013 | White et al. | |
| 2013/0191229 | A1 | 7/2013 | Rodgers et al. | |
| 2013/0282533 | A1 | 10/2013 | Elizabeth et al. | |
| 2014/0114776 | A1 | 4/2014 | Solanki et al. | |
| 2014/0156319 | A1 | 6/2014 | Deeb | |
| 2016/0104257 | A1 | 4/2016 | Lee | |
| 2016/0189287 | A1 | 6/2016 | Van | |
| 2018/0374169 | A1 | 12/2018 | Videnovic | |
| 2020/0098466 | A1* | 3/2020 | Murdoch | G16H 20/60 |
| 2020/0244752 | A1 | 7/2020 | Trainor | |
| 2020/0250659 | A1 | 8/2020 | Rule et al. | |
| 2020/0364067 | A1 | 11/2020 | Accame | |
| 2020/0364810 | A1* | 11/2020 | Carter | H04N 1/00411 |
| 2021/0042599 | A1 | 2/2021 | Vibbert | |
| 2021/0312576 | A1* | 10/2021 | Clarke | G06Q 20/202 |
| 2022/0058723 | A1 | 2/2022 | Swett et al. | |
| 2022/0207592 | A1* | 6/2022 | Swanson | G06Q 50/12 |

FOREIGN PATENT DOCUMENTS

| | | | |
|---|---|---|---|
| JP | 2019-185078 | A | 10/2019 |
| JP | 2020-87231 | A | 6/2020 |
| WO | 2015/129040 | A1 | 9/2015 |
| WO | 2022/039825 | A1 | 2/2022 |

OTHER PUBLICATIONS

Karim Kristiant "Progressive Web Application Migrating Web Application to a Progressive Web Application", May 5, 2017, 4 pages.

Transparsoft, Custom Web Development, https://web.archive.org/web/20200814221827/https://transparsoft.com/, transparsoft.com, dated Nov. 2, 2022, 5 pages.

PWA1, Rista, "Rista-the new age mobile point of sale (POS Rista apps", Rista.com, dated Jul. 28, 2020, 7 pages.

PWA2, Romo, Amberley, "Seriously, though. What is a progressive web app?", medium.com, dated Aug. 6, 2018, 11 pages.

PWA3, Furrugia, Kevin, "A beginner's guide to progressive web apps", Smashing Magazine.com, dated Aug. 11, 2016, 26 pages.

Jacob et al., "Progressive Web Apps: A Lighter Alternative", International Research Journal of Engineering and Technology (IRJET), vol. 07, Issue: 04, Apr. 2020, 4 pages.

Luca Spezzano, "How to make your website a PWA (Progressive Web App) and why is it necessary?", Oct. 23, 2019, Available at <URL: https://coliss.com/articles/build-websites/operation/work/turn-your-website-into-a-pwa.html>, 22 pages including English Translation.

Wang Shen, "[Run Immediately without installation!] I tried using Android Instant Apps", Jun. 6, 2017, Available at <URL:https://techblog.recruit.co.jp/article-501/>, 7 pages including English Translation.

PWA Service Worker, "Hands-on Progressive web Apps", China Machine Press, ISBN 978-7-111-65258-8, Apr. 2020, 8 pages with English Translation.

* cited by examiner

MERCHANT MENUS ACCESSIBLE TO CUSTOMER DEVICES VIA MERCHANT-MANAGED IDENTIFIERS

CROSS-REFERENCE TO RELATED APPLICATION(S)

This application is a continuation of and claims priority to, U.S. patent application Ser. No. 16/998,921, entitled "CUSTOMER-DEVICE APPLICATION SITES ACCESSIBLE VIA MERCHANT-MANAGED IDENTIFIERS", filed on Aug. 20, 2020, which is incorporated by reference herein in its entirety.

TECHNICAL FIELD

Brick-and-mortar transactions can be high-friction transactions, such that customers and merchants can be required to interact with one another and other physical items (e.g., menus, writing utensils, payment terminals, etc.) to effectuate such transactions. There are scenarios where customers and/or merchants aim to expedite transactions and/or minimize friction associated with such transactions. Existing techniques are not user-friendly and/or accessible for small merchants due to developmental complexity and costs. Furthermore, existing techniques can be slow due to time required for downloading and/or registration, and have limitations on use due to network connectivity.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
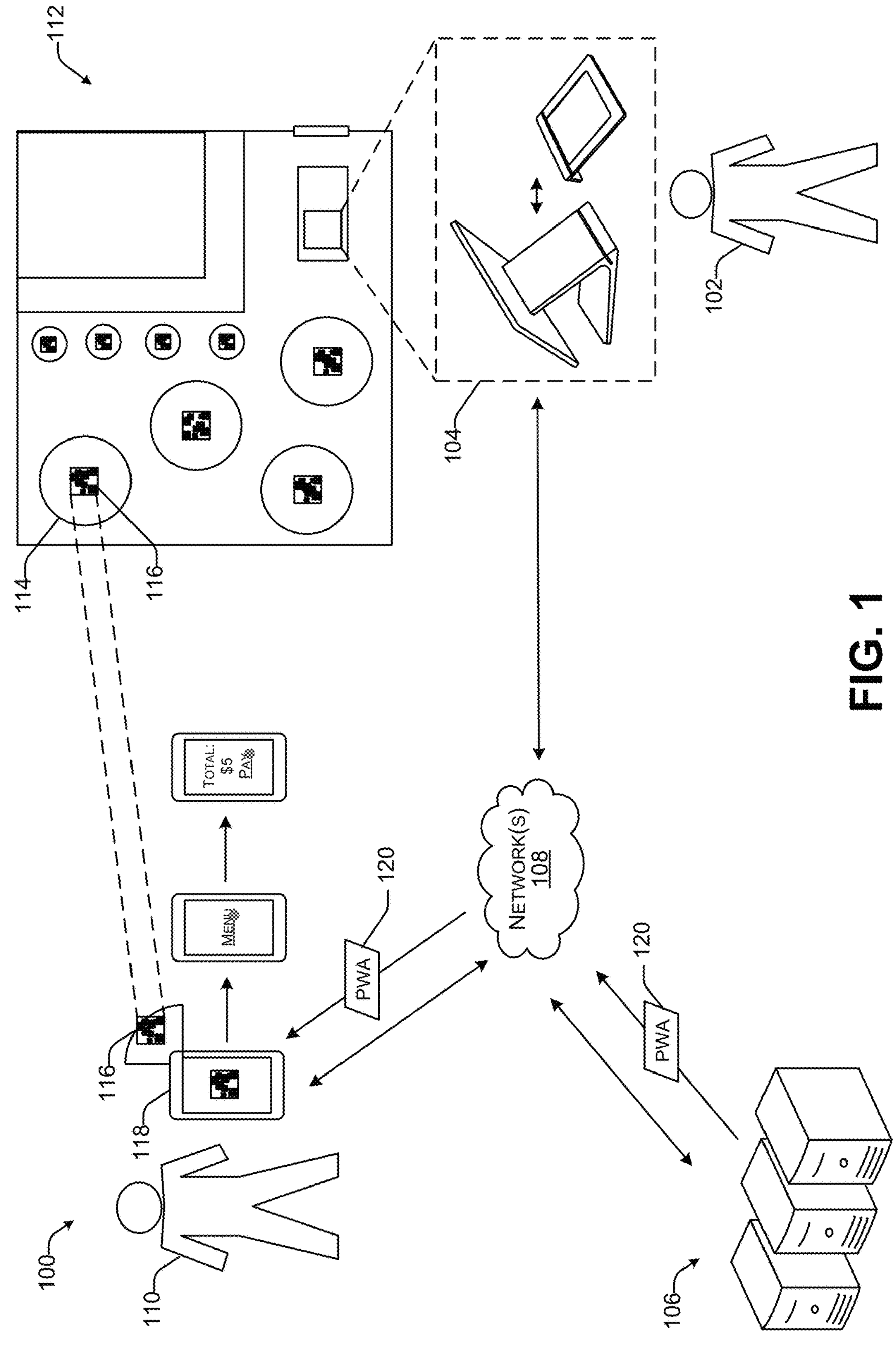
FIG. 1 illustrates an example environment for customer-device application sites (e.g., content presented via a progressive web applications) that are accessible via merchant-managed identifiers (e.g., identification codes), as described herein.

Techniques described herein are directed to, among other things, customer-device application sites (e.g., content presented via progressive web applications) that are accessible via merchant-managed identifiers (e.g., identification codes). In an example, a merchant can utilize a service of a service provider to generate or otherwise associate identification codes with particular locations associated with a brick-and-mortar store or establishment of the merchant. For instance, such an identification code, which can be a Quick Response (QR) code, barcode, identifier of a Radio-Frequency Identification (RFID) device, etc., can be associated with a table in a restaurant, a seat in a movie theater, a parking spot in a parking lot, a hotel room, or the like. When a customer is in the brick-and-mortar store or other establishment, a customer can scan the identification code using a computing device (e.g., their mobile device). The computing device can provide the scanned identification code to server(s) associated with the service provider and the server(s) can cause merchant data associated with the merchant to be presented via the computing device of the customer. In some examples, such merchant data can comprise a menu of items offered for sale, a layout of the brick-and-mortar store or establishment, or the like. The customer can interact with a user interface to provide input associated with a transaction. In some examples, the input can be an order from an online menu, a reservation for a table, seat, parking spot, hotel room, and/or the like, etc. In some examples, the customer can interact with the merchant data—via the user interface—to provide payment data, gratuity, feedback, etc. As such, the customer can transact with the merchant without touching or otherwise interacting with physical items (e.g., menus, writing utensils, etc.), payment terminals and/or computing devices of the merchant, and/or the like. This enables the customer to provide input via their own computing device and thus can reduce friction associated with brick-and-mortar transactions.

In some examples, the merchant data can be presented via the computing device of the customer via progressive web application technology. A progressive web application is a type of application software delivered over a network (e.g., the web) that can be built using web technologies (e.g., HTML, CSS, JavaScript, etc.). A progressive web application can be used to provide user experiences similar to native applications on computing devices, with fewer development resources. In at least one example, responsive to scanning an identification code associated with a designated seating area and/or brick-and-mortar store, a progressive web application can be provided to the computing device of the customer (e.g., downloaded by the computing device of the customer). The merchant data can therefore be presented via a web browser on the computing device by the progressive web application.

In at least one example, a customer can enter a brick-and-mortar store of a merchant. The customer can select a table to sit at, which can have an identification code associated therewith (e.g., a QR code, barcode, RFID device, etc.). The customer can use their mobile device to scan the identification code. The identification code can identify the table (e.g., location number, seat number, etc.), and in some examples, if the merchant has multiple brick-and-mortar stores, the scanned identification code can indicate the specific brick-and-mortar store where the customer is located. In some examples, an indication of the scanned identification code can be associated with data indicating a date, a time, the customer, etc. In at least one example, server computing device(s) ("server(s)") associated with a service provider can receive the indication of the scanned identification code and can cause a progressive web application (which can present content via an "app site") to be downloaded onto the mobile device of the customer. The progressive web application can cause an online menu to be presented via a web browser on the mobile device. The progressive web application can provide an experience similar to a native application such that it presents content similar to how content would be presented in a native application and can provide push notifications via the "app site." In at least one example, the customer can interact with their own mobile device to place an order that—because the customer already scanned the identification code—can be associated with an indication of where the customer is located in the brick-and-mortar store. Such information can be provided to front-of-house computing systems, back-of-house computing systems, kitchen display systems, or the like to enable fulfillment of the order and/or service to the customer. As such, the customer can have an in-seat dining experience using their own mobile device using progressive web application technology. Techniques can be similarly applicable to "in-store" experiences at theaters, sporting fields or arenas, hotels, parking lots, retail, or the like.

As described above, brick-and-mortar transactions can be high-friction transactions, such that customers and merchants can be required to interact with one another and other physical items (e.g., menus, writing utensils, payment terminals, etc.) to effectuate such transactions. There are scenarios where customers and/or merchants aim to expedite transactions and/or minimize friction associated with such transactions. Existing techniques are not user-friendly and/or accessible for small merchants due to developmental complexity and costs. Furthermore, existing techniques can be slow due to time required for downloading and/or registration and have limitations on use due to network connectivity.

In some examples, merchants can opt to develop and deploy native applications (or hybrid applications) to enable customers to interact with merchants via their own devices. Such development can be complex and costly, often making development of native applications unrealistic for small merchants. Further, for customers to use such native applications, they often must install the native applications on their computing devices and accept terms and conditions before using such native applications. Downloading a native application can consume bandwidth and can require time, which, in some examples, can limit the availability of native applications to customers. In a dine-in experience, a customer may not want to spend the time to download a native application, register to use the native application, and the like.

In some examples, merchants can opt to deploy web applications. A web application is a software application that is accessed through a web browser. Web applications can be slow and heavy, making the user experience associated therewith frustrating and disheartening. Web applications require a connection to the Internet (or another network) and, as such, when there is a poor-quality connection or computing devices associated with such web applications are offline, content presented via web applications can be unavailable. Further, web applications can be complex and difficult to use, especially on small form factors such as mobile computing devices.

Progressive web applications offer solutions to the above-identified problems with native applications and/or web applications. For example, progressive web applications use resources from web browsers to present experiences that are similar to native applications. Progressive web applications can provide more features and perform much faster than web applications. Further, progressive web applications can be portable across different types of platforms (e.g., desktop, mobile, etc.) and, in some examples, can fit on various display sizes (e.g., of desktop, mobile, tablet, etc. computing devices), thereby making progressive web applications accessible and user-friendly. That is, progressive web applications can be responsive in that they can fit different form factors and/or screen sizes. Progressive web applications can be more user-friendly than native applications and/or web applications. For example, progressive web applications can be accessible when an Internet connection is of poor quality and/or the computing devices are offline, be up-to-date (e.g., updates to content can be performed in the background), etc.

Progressive web applications can offer security by utilizing HTTPS protocol to protect the privacy and integrity of data associated with the progressive web applications. Progressive web applications can be "progressive" in that they can work for various users, regardless of which web browser is used. Further, progressive web applications, which can use an application shell model, can provide similar user experiences as native applications. That is, a customer can access a progressive web application via a web browser and/or a shortcut icon that can be installed on a desktop or home screen of a computing device operable by such a customer. In some examples, progressive web applications can use push notifications to maintain engagement with customers. Moreover, progressive web applications can be shared easily via uniform resource locators (URLs) and do not require complex installation. That is, progressive web applications can use URLs to indicate current states of the progressive web applications, which can enable the progressive web applications to retain or reload its state when users bookmark or share a URL associated with a progressive web application (e.g., progressive web applications can be linkable).

As such, techniques described herein, leverage progressive web applications—which provide similar user experiences to native applications and/or web applications—to enable customers to have faster access to merchant data, via technology that provides an improved user experience over conventional alternatives, such as native applications and/or web applications. Such technology can therefore streamline transactions and other interactions between customers and merchants at brick-and-mortar stores or other establishments of such merchants. Additional details are provided below.

FIG. 1 illustrates an example environment 100 for customer-device application sites (e.g., content presented via progressive web applications) that are accessible via merchant-managed identifiers (e.g., identification codes), as described herein.

In at least one example, a merchant 102 can offer items (e.g., goods or services) for sale or other means of acquisition. In at least one example, the merchant 102 can operate a computing device (i.e., a merchant computing device 104). The merchant computing device 104 can comprise one or more components that can communicate with one or more remotely located computers associated with a service provider (e.g., server(s) 106) via one or more networks 108. As illustrated in FIG. 1, the merchant computing device 104 comprises a merchant-facing component and a customer-facing component. In such an example, the merchant-facing component and/or the customer-facing component can have an application installed thereon that enables the merchant 102 to perform transactions with customers, such as the customer 110, and to perform other merchant operations (e.g., order management, reservation management, identification code generation, etc.). In some examples, the application can be provided by the service provider to specially configure the merchant computing device 104 (and/or component(s) associated therewith) as a payment terminal. While an application is described herein, in some examples, the merchant 102 can interact with the merchant computing device 104 via a user interface presented by an additional or alternative mechanism, such as a web browser.

In at least one example, the merchant-facing component can have a reader device integrated therewith. In at least one example, the merchant-facing component can be coupled to the customer-facing component, which can have a reader device integrated therewith. In some examples, the merchant-facing component and the customer-facing component can be associated with their own displays. In some examples, the merchant computing device 104 can be a single computing device that is rotatable or otherwise movable to allow merchants and/or customers to interact with the merchant computing device 104. Additional details associated with the merchant computing device 104 are described below.

In at least one example, the merchant 102 can offer items for sale via different commerce channels. For example, the merchant 102 can offer items for sale via an online commerce channel (or, an "ecommerce channel"), which can enable customers the fulfillment option to acquire items via pick-up, delivery, shipping, or the like. Further, in some examples, the merchant 102 can offer items for sale via a brick-and-mortar commerce channel (or an "in-store commerce channel"), where the merchant 102 fulfills orders by delivering the items to customers at brick-and-mortar store(s) of the merchant 102. In some examples, a brick-and-mortar store can include one or more designated seating areas, such as tables, chairs, or the like. A top-down view 112 of a layout of a brick-and-mortar store of the merchant 102, including a plurality of designated seating areas, is illustrated in FIG. 1.

In at least one example, the merchant 102 can interact with the merchant computing device 104 to generate identification codes, which can be associated with individual of the designated seating areas. For example, a designated seating area (e.g., a table) 114 can be associated with an identification code 116. In FIG. 1, the seating areas are illustrated as tables and chairs (i.e., bar stools). However, a designated seating area can be a seat in a theater, a parking spot in a parking lot, a hotel room, and/or the like. In FIG. 1, the identification code 116 is illustrated as a QR code. However, an identification code can be a barcode, an identifier associated with an RFID device, or the like. In some examples, the identification code can be predetermined and the merchant 102 can interact with the merchant computing device 104 to associate a predetermined identification code with identifier(s) of a designated seating area and/or brick-and-mortar store. The identification codes—whether generated by the merchant 102 and/or associated with identifier(s) of a designated seating area and/or brick-and-mortar store—can indicate a designated seating area and/or brick-and-mortar store of the merchant 102.

In at least one example, the customer 110 can operate a computing device (i.e., customer computing device 118) to scan, or otherwise read, the identification code 116. In some examples, the customer computing device 118 can include a reader device that can read the identification code 116. In at least one example, the customer computing device 118 can send an indication of the identification code 116 to the server(s) 106, via the network(s) 108. In some examples, the indication of the identification code 116 can be associated with data such as a date, a time, a customer identifier, a device identifier, a cookie, or the like. In at least one example, the server(s) 106 can receive the identification code 116 and can send a progressive web application (PWA) 120 to the customer computing device 118. That is, the customer computing device 118 can download the progressive web application 120 via a web browser of the customer computing device 118. In some examples, the customer computing device 118 can have previously downloaded the progressive web application 120, for example by inputting a URL associated with the progressive web application 120 into a web browser associated with the customer computing device 118. In such examples, if the indication of the identification code 116 may be associated with a cookie or other indicator indicating that the progressive web application 120 was previously downloaded on the customer computing device 118.

The progressive web application 120, as described above, can be a type of application software delivered over a network (e.g., the web) that can be built using web technologies (e.g., HTML, CSS, JavaScript, etc.). The progressive web application 120 can be used to provide user experiences similar to native applications on computing devices, such as the customer computing device 118, with fewer development resources. The progressive web application 120 can use resources from web browser(s) to present an experience that is similar to a native application. In at least one example, the progressive web application 120 can utilize HTTPS protocol to protect the privacy and integrity of data associated with the progressive web application 120 (e.g., data provided via the progressive web application 120 and/or transmitted via the network(s) 108). The progressive web application 120 can be configured to work for various users, regardless of which web browser is used. Therefore, progressive web application 120 can be progressive (having been built using progressive enhancement patterns). However, features available via the progressive web application 120 can be dependent on web browser support. For example, features including independence from connectivity, installation to a home screen or desktop, push messaging, etc. can depend on web browser support.

As described above, the progressive web application 120 can be more user-friendly than native applications and/or web applications. For example, the progressive web application 120 can fit on various display sizes (e.g., of desktop, mobile, tablet, etc. computing devices), be accessible when an Internet connection is of poor quality and/or the computing devices are offline, be up-to-date (e.g., updates to content can be performed in the background), etc. Further, the progressive web application 120, which can use an application shell model, can provide a similar user experience as native applications. That is, the customer 110 can access the progressive web application 120 via a web browser and/or a shortcut icon that can be installed on a desktop or home screen of computing devices operable by such customers. In some examples, the progressive web application 120 can use push notifications to maintain engagement with the customer 110. Moreover, the progressive web application 120 can be shared easily via a uniform resource locator (URL) and does not require complex installation.

In at least one example, the progressive web application 120 can be associated with a manifest, which provides developers a centralized place to store metadata associated with the progressive web application 120. Such metadata can include, but is not limited to, the name of the progressive web application 120, links to the progressive web application 120 icons or image objects, preferred URL to launch or open the progressive web application 120, the progressive web application 120 configuration data, a default orientation of the progressive web application 120, display mode options, and/or the like.

In at least one example, the progressive web application 120 can be associated with an object (e.g., a "service worker") that is configured to execute client-side code in a background thread separate from a main thread of the web browser and provide a scriptable network proxy to the web browser to programmatically manage communication between the progressive web application 120 and the server(s) 106. In at least one example, the object can be independent of the progressive web application 120 with which it is associated. In some examples, a portion of the progressive web application 120 and/or content associated therewith can be cached by the object for future interactions with the progressive web application 120. That is, in some examples, after an initial loading of content, the same content and/or page elements need not be re-downloaded and/or re-rendered each time the progressive web application 120 is subsequently accessed. In some examples, the object can utilize one or more application programming interfaces (APIs) to make the progressive web application 120 work offline. Such APIs can provide a mechanism to retrieve content via the network(s) 108 and a mechanism for a persistent content storage for application data). Caching resources can enable content to load faster under various network conditions.

In at least one example, the object can help keep content associated with the progressive web application 120 up-to-date. In some examples, the object can be a file (e.g., JavaScript file) that operates as a type of web worker. The object can work separately from the main thread of the web browser to handle push notifications, synchronize data in the background, cache or retrieve resource requests, intercept network requests, receive centralized updates, and/or the like. Such an object can enable the progressive web application 120 to provide the high performance and rich user experience of native applications, with low storage space, real-time updates, and improved search engine visibility of traditional web applications (e.g., progressive web applications, as websites, can be discoverable in search engines).

In some examples, the object can utilize one or more other APIs to enable the progressive web application 120 to work like a native application. For example, the object can use a notifications API to display and interact with notifications using a native notification system of an operating system of the customer computing device 118. A push API can enable the progressive web application 120 to subscribe to a push service and receive push messages, for example, from the server(s) 106. Push messages can be delivered to the object, which can use the information in the message to update the local state or display a notification to the customer 110. Because the object runs independently of the progressive web application 120, it can receive and display notifications even when the web browser is not running. In some examples, a background sync API can defer actions until the customer computing device 118 has stable connectivity. This can be useful to ensure that whatever the customer 110 wants to send is actually sent. This API can also allow the server(s) 106 to push periodic updates to the progressive web application 120 so the progressive web application 120 can update when it is next online. In some examples, a channel messaging API can enable the object to communicate with other objects and with the progressive web application 120. Examples of this API can include new content notification (e.g., making new content available via the progressive web application 120) and updates that utilize user interaction. The progressive web application 120 can utilize additional or alternative APIs, or additional or alternative functional components, to perform operations as described herein.

In at least one example, the object can go through a three-step lifecycle of registration, installation, and activation. Registration can involve communicating the location of the object to the web browser in preparation for installation. Installation can occur when there is no object installed in the web browser, or if there is an update to the object (e.g., a byte difference between a new object and a previously installed object). Activation can occur when all of the web pages of the progressive web application 120 are closed, so that there is no conflict between the previous version and the updated one. The lifecycle also helps maintain consistency when switching among versions of the object since, in some examples, only a single object can be active for a domain.

In at least one example, the progressive web application 120 can cause merchant data to be presented via the web browser of the customer computing device 118. In some examples, such merchant data can be a menu of items, a layout of the brick-and-mortar store of the merchant 102, or the like. In some examples, the customer 110 can interact with the customer computing device 118 (e.g., a user interface associated therewith) to provide an input, an indication of which can be transmitted to the server(s) 106 and/or the merchant computing device 104. In at least one example, the server(s) 106 and/or the merchant computing device 104 can perform an operation based on such input. Examples are provided below.

In some examples, the progressive web application 120 can present a request for payment for a transaction. In such examples, the customer 110 can input payment data, provide a payment instrument (e.g., that can be read by a reader device associated with the customer computing device 118), etc., to facilitate payment for a transaction with the merchant 102. In some examples, the customer 110 can provide payment data to the merchant 102, for instance via a reader device associated with the merchant computing device 104 or via a card-on-file transaction (e.g., using stored payment data) that is accessible by the service provider and/or merchant 102. Regardless of whether the payment data is provided via the customer computing device 118 or the merchant computing device 104, the server(s) 106 can receive the payment data and can attempt to process the payment for the cost of the transaction.

In some examples, the progressive web application 120 can be associated with an instant application. An instant application can be a part of an application, such as the progressive web application 120, that can be executed on a user computing device quickly and without a user needing to download the entire progressive web application 120. That is, a part of the progressive web application 120 can include instructions (e.g., code) for enabling a particular functionality (e.g., a single task, a couple of tasks, etc.) that can be performed by a user computing device, such as the customer computing device 118, without the user needing to download the entire progressive web application 120. Such a part can be downloaded to and opened quickly on the customer computing device 118, even when it is not already on the customer computing device 118. That is, such an instant application can provide means for running application code "on demand" on the customer computing device 118 and can act as a representation of a full application (e.g., the progressive web application 120) before the user commits to downloading the full application. In some examples, information input to an instant application can persist so that such information can be integrated into the full application when the remaining part(s) of the application are downloaded onto the customer computing device 118. In one example, an instant application is a portion of a full application, and as such, the instant application can have a set of functionalities smaller than the set of functionalities in the full application. That is, an instant application can comprise a portion of the full progressive web application 120 and can therefor provide a smaller set of functionalities than the full progressive web application 120. In some examples, the remaining portions of the progressive web application 120 can be downloaded at a time after an instant application is downloaded and/or executed.

Instant applications can be discoverable. In some examples, users can scan or otherwise read an identification code or other interactive element associated with a particular application (or a portion thereof). Such an identification code or other interactive element can be associated with a Quick Response (QR) code, a radio-frequency identification (RFID) tag, a barcode, a near-field communication (NFC) tag, a uniform resource identifier (URI), an image, etc. In some examples, identification codes can be affixed to, or otherwise associated with, physical objects, such as tables, designated seating areas, receipts, bicycles, scooters, vehicles, doors, items offered for sale, etc. In some examples, an identification code can be presented via an electronic device (e.g., a customer-facing display of a point-of-sale device). In some examples, interaction with an identification code or other interactive element can cause an instant application to be activated on a user computing device. In some examples, users can tap a card reader or another NFC device to allow an instant application to be activated on a user computing device. In some examples, an instant application can be discoverable via a banner associated with a web page, a link in a message, a map user interface, a library of recently used instant applications, or the like. In some examples, instant applications can be discoverable based at least in part on a geolocation of a user computing device, a time, a date, an event, or any other context.

Upon discovery, a part of an application (e.g., the instant application) can be downloaded onto, and therefore executable by, the customer computing device 118 and a user interface can be presented to enable a user to interact with the portion of the application executable by the customer computing device 118. That is, an instant application can be discoverable at a time when or a location where users can use it and can be focused on a specific task (e.g., booking, ordering, paying, etc.). In some examples, users can start and finish an experience in seconds, minutes, or other period of time and at a later time, users can be presented with the opportunity to download the full application (or additional portions thereof). In at least one example, a user can interact with instant applications without downloading corresponding applications. In some examples, if a user launches an instant application regularly (even without downloading the full application), the instant application can store data from previous uses and can leverage intelligence to learn about the user and/or their interactions with the instant application. Such intelligence can be used to present recommendations, expedite an ordering process, expedite a checkout flow, or the like. In some examples, if a user decides to download the full instant application, data previously provided to the instant application can be used by the full application to streamline the handoff. In some examples, authorization provided for access to a camera, a microphone, Bluetooth, etc., which has already been requested by the instant application, can be provided to the full application to further streamline the handoff.

As such, techniques described herein can be performed by the progressive web application 120 and/or a portion thereof (e.g., as an instant application). In examples where functionality described herein is performed by an instant application, additional or alternative functionality availed via other portions of the progressive web application 120 can be subsequently accessed, for example, via another instant application or the full progressive web application 120.

FIGS. 2A-2D and 3A-3C illustrate example graphical user interfaces (GUIs) that can be presented via a web browser of the customer computing device 118 by the progressive web application 120. The example GUIs are for illustrative purposes and should not be construed as limiting. For instance, techniques described herein can present additional or alternative content via a GUI and/or additional or alternative configurations of content via a GUI. In some examples, content can be presented via an additional or alternative user interface (e.g., a speaker, etc.).

Figure 2A:
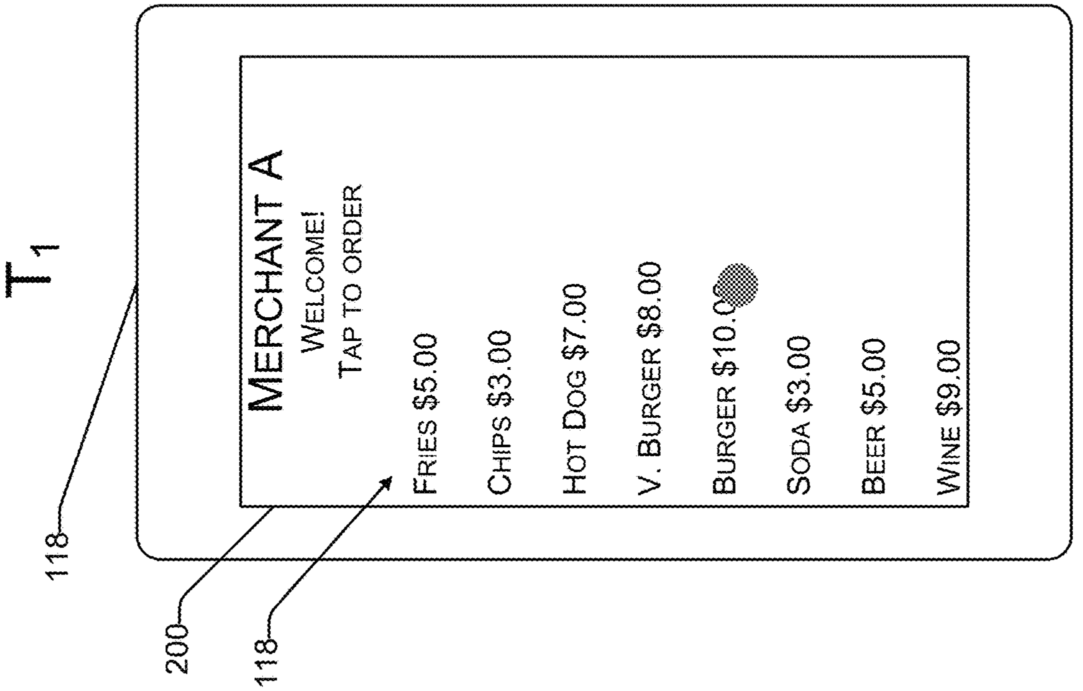
FIG. 2A illustrates an example graphical user interface (GUI) that can be presented via a web browser of a customer computing device by a progressive web application.
Figure 2B:
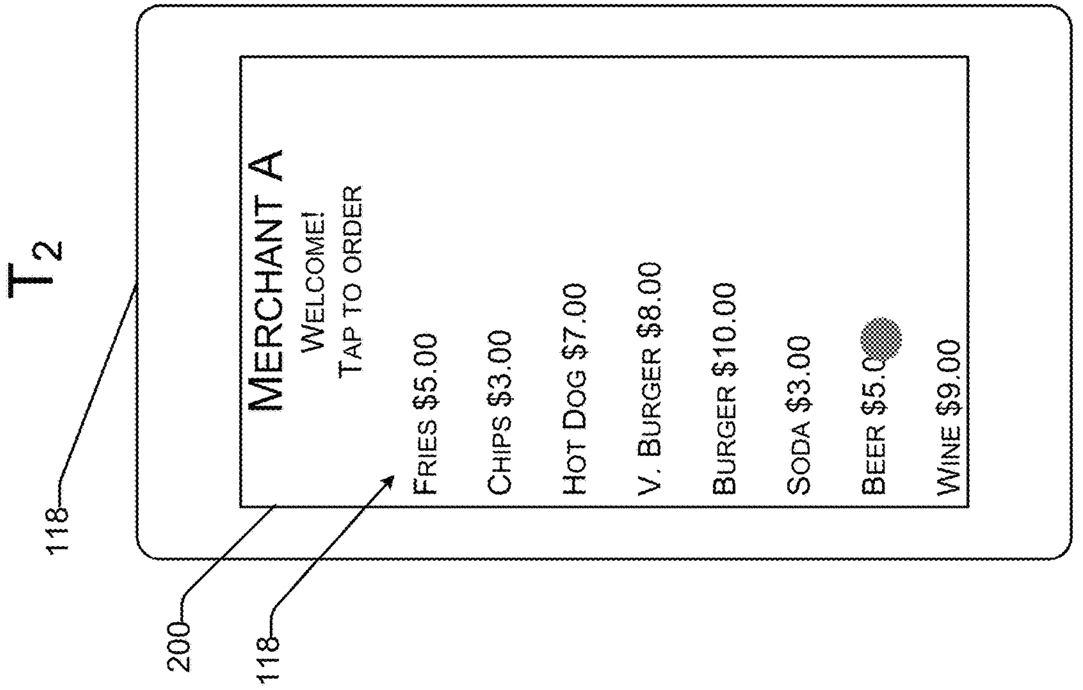
FIG. 2B illustrates another example GUI that can be presented via a web browser of a customer computing device by a progressive web application.

As described above, the progressive web application 120 can cause merchant data to be presented via the web browser. In some examples, such merchant data can be presented responsive to the customer computing device 118 reading the identification code 116 and sending an indication thereof to the server(s) 106. In some examples, such merchant data can include a menu of items for sale by the merchant 102. That is, in at least one example, the identification code 116 can link to ordering pages for individual physical locations (e.g., table/seat at a brick-and-mortar store). In some examples, the customer 110 can add items to an order without having to sign-up. In FIGS. 2A and 2B, the example GUI 200 includes user interface elements 204 representative of items offered for sale by the merchant 102. That is, in FIGS. 2A and 2B, the GUI 200 can represent an ordering page. In some examples, the user interface elements 204 can be text elements, graphical elements, pictures, icons, selectable elements, or any other object that can be presented via a GUI. In some examples, the menu of items can include one or more items that can be identified in an inventory of the merchant 102 as available for sale by the merchant 102.

In at least one example, the customer 110 can interact with the customer computing device 118 to select an item to order. In such an example, the progressive web application 120 can detect an input indicating the selection and can send an indication of the selection to the server(s) 106. In some examples, the server(s) 106 can generate a data structure with which an indication of the item can be associated. In some examples, the data structure can represent a ticket. In some examples, the data structure can be stored, at least temporarily, such that indications of one or more additional items can be added to the data structure over time. In such examples, the data structure can represent an "open ticket," which can persist until the customer 110 and/or merchant 102 provide an indication to close the open ticket and/or an event occurs (e.g., a period of time lapses, a threshold is satisfied, etc.) such to cause the open ticket to close automatically.

As a non-limiting example, in FIG. 2A, which can be associated with a first time, the customer 110 can interact with the GUI 200 to order (e.g., provide an input indicating a selection of) a burger. The progressive web application 120 can send an indication of the input to the server(s) 106. The server(s) 106 can associate an indication of the burger with a data structure. In FIG. 2B, which can be associated with a second time after the first time, the customer 110 can interact with the GUI 200 to order (e.g., provide an input indicating a selection of) a beer. The progressive web application 120 can send an indication of the input to the server(s) 106. The server(s) 106 can associate an indication of the beer with the data structure. In examples where the customer 110 interacts with the customer computing device 118 at different times, the web browser associated with the progressive web application 120 can remain open. That is, so long as web browser associated with the progressive web application 120 remains open, the customer 110 can interact with the GUI 200. In some examples, content presented via the GUI 200 can be updated while the web browser associated with the progressive web application 120 remains open so that the content is up-to-date and need not be re-cached. In some examples, so long as the web browser associated with the progressive web application 120 remains open, notifications and/or other content can be pushed to the customer computing device 118 from the merchant computing device 104 and/or the server(s) 106.

In some examples, customer information can be saved based on web browser/cookie session parameters, thereby allowing such customer information to remain attached. If a customer provides an identifier (e.g., a customer identifier, a phone number, an email address, etc.), payment data, etc., such information can be saved. In some examples, a customer can provide a confirmation authentication using a code or other means for authentication. As such, so long as the web browser remains open, content associated with the progressive web application 120 can be accessible to the customer 110. For instance, the customer 110 can view/utilize presets previously made (e.g., location, previous orders/reorders, account subscriptions, address, payment, etc.) and/or can continue to interact with the content provided by the progressive web application 120.

In at least one example, if the customer 110 accessed the menu of items in association with scanning or otherwise reading an identification code associated with a designated seating area and/or brick-and-mortar store of the merchant 102 (e.g., the identification code 116), the input can be associated with an indication of the designated seating area and/or the brick-and-mortar store of the merchant 102. In some examples, such information can be used by the merchant 102 (or employees, agents, etc. associated therewith) to determine how to fulfill the order for the item (e.g., where to deliver the item). In some examples, such order(s) can be provided by the server(s) 106 to the merchant computing device 104 (e.g., the application associated therewith), a kitchen display system of the merchant 102, and/or another computing device of the merchant 102 (e.g., front-of-house and/or back-of-house computing system(s)). In some examples, the order(s) can be added to a queue with one or more other orders (i.e., an "order queue") that can be received via the same commerce channel and/or additional commerce channels or alternative commerce channels (e.g., online or in-store). That is, in some examples, a queue can be associated with orders received from other progressive web applications, online stores, applications associated with merchant computing devices (e.g., in-store orders), and/or the like and can be integrated into a single queue of orders to be fulfilled by the merchant 102.

Figure 2C:
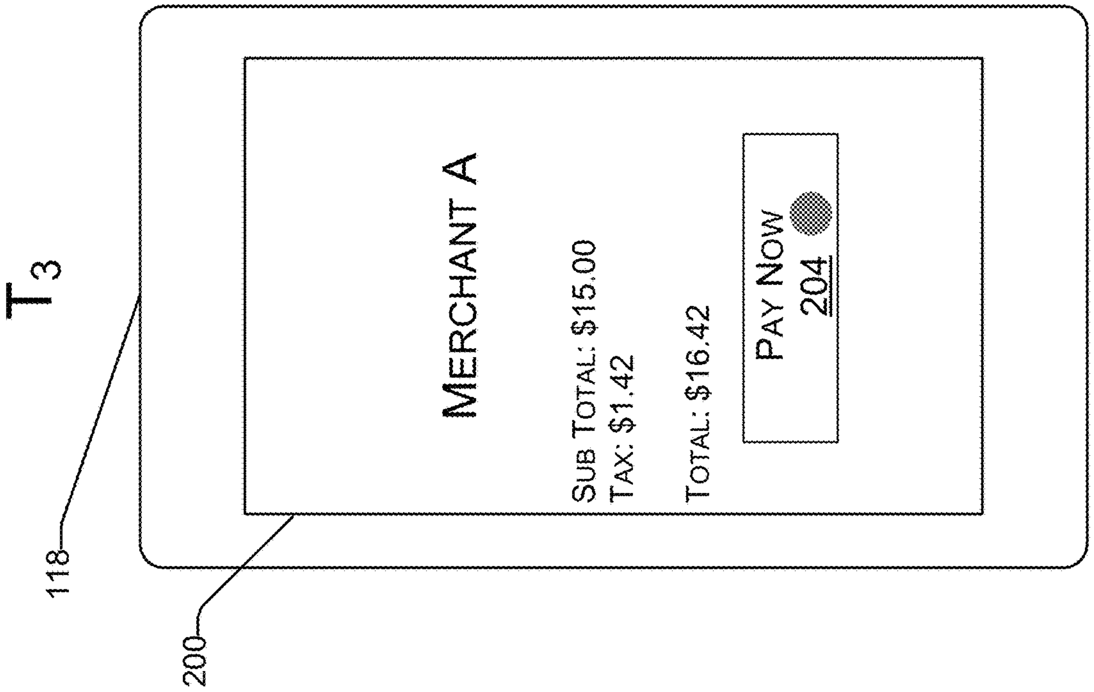
FIG. 2C illustrates yet another example GUI that can be presented via a web browser of a customer computing device by a progressive web application.

In at least one example, at a third time, after the first time and the second time, the customer 110 and/or the merchant 102 can provide an indication to close the open ticket and/or settle the transaction via a payment. In such an example, the progressive web application 120 can cause a payment user interface to be presented via the GUI 200, as illustrated in FIG. 2C. In some examples, the payment user interface can be presented via the GUI 200 instead of the menu of items, as described above. In some examples, the payment user interface can be presented via a pop-up, overlay, or the like. In at least one example, the customer 110 can interact with the GUI 200 to provide payment data. For example, the customer 110 can select a selectable control 204 to provide such payment data. In some examples, the customer 110 can provide payment data via a secure portal (e.g., via manual input), which can be presented responsive to selection of the selectable control 204. In such an example, the payment data can be transmitted securely to the server(s) 106 for payment processing. In some examples, the customer computing device 118 can include a reader device (e.g., a near-field communication (NFC) reader) and the customer 110 can cause an interaction between a payment instrument and the customer computing device 118 such that the customer computing device 118 can obtain the payment data from the payment instrument (e.g., via the reader device). In some examples, the customer 110 can access stored payment data (e.g., stored in a wallet application associated with the customer computing device 118) that can be provided to the server(s) 106. In some examples, the customer 110 can utilize a third-party payment mechanism (e.g., Apple Pay, Google Pay, etc.) to provide payment data to the server(s) 106 for payment processing.

In some examples, during a payment flow (i.e., checkout), the customer 110 can opt to save their payment data to make purchases and/or place orders. In such an example, the payment data can be saved locally by the progressive web application 120 and/or the server(s) 106.

In some examples, the customer 110 can provide payment data to the merchant 102, via the merchant computing device 104. For instance, the customer 110 can cause an interaction between a payment instrument and a reader device associated with the merchant computing device 104. In such an example, the merchant computing device 104 can send the payment data to the server(s) 106 for payment processing. In some examples, the customer 110 can store payment data with the merchant 102 and/or the service provider. In such an example, the customer 110 can provide an identifier to identify themselves and the server(s) 106 can access stored payment data that corresponds with the identifier. Such a transaction can be called a "card-on-file" transaction.

While described above as being associated with a third time, after the first time and the second time, payment data can be obtained by the server(s) 106 at any time. For example, the server(s) 106 can receive payment data at various times, such as prior to when the customer 110 arrives at the brick-and-mortar store of the merchant 102, at the time the customer 110 orders the first item (i.e., at the first time), after the customer 110 orders the first item, at the time the customer 110 orders the second item (i.e., at the second time), after the customer 110 orders the second item, after the customer 110 leaves the brick-and-mortar store of the merchant 102, etc.

Figure 2D:
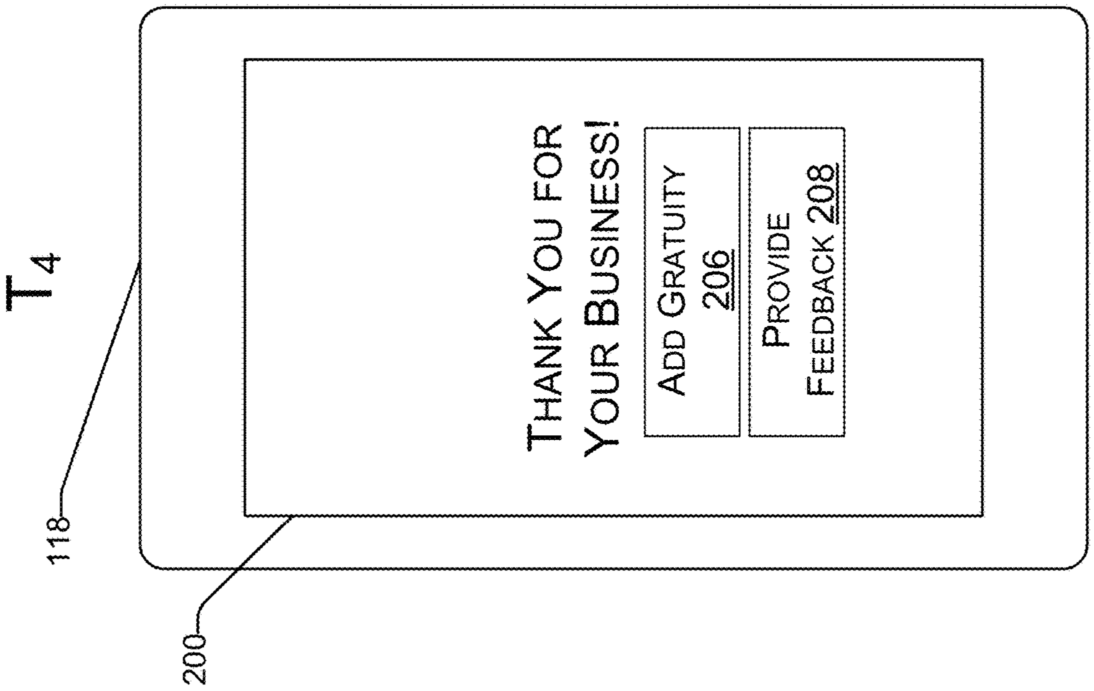
FIG. 2D illustrates another example GUI that can be presented via a web browser of a customer computing device by a progressive web application.

FIG. 2D illustrates an example of a gratuity and/or feedback user interface that can be presented via the GUI 200. In at least one example, at a fourth time, after the first time, the second time, and the third time, the progressive web application 120 can cause a gratuity and/or feedback user interface to be presented via the GUI 200, as illustrated in FIG. 2D. In some examples, the gratuity and/or feedback user interface can be presented via the GUI 200 instead of the menu of items, the payment user interface, etc., as described above. In some examples, the gratuity and/or feedback user interface can be presented via a pop-up, overlay, or the like. In at least one example, the gratuity and/or feedback user interface can include one or more selectable controls 206 (e.g., gratuity), 208 (e.g., feedback) that, when selected, can enable the customer 110 to provide a gratuity and/or feedback associated with the transaction. In some examples, based at least in part on detecting a selection of one of the selectable controls 206, 208, the progressive web application 120 can send an indication of the selection to the server(s) 106. The server(s) 106 can cause an additional or alternative user interface, pop-up, overlay, or the like to be presented to enable the customer 110 to provide the gratuity and/or feedback.

Figure 3C:
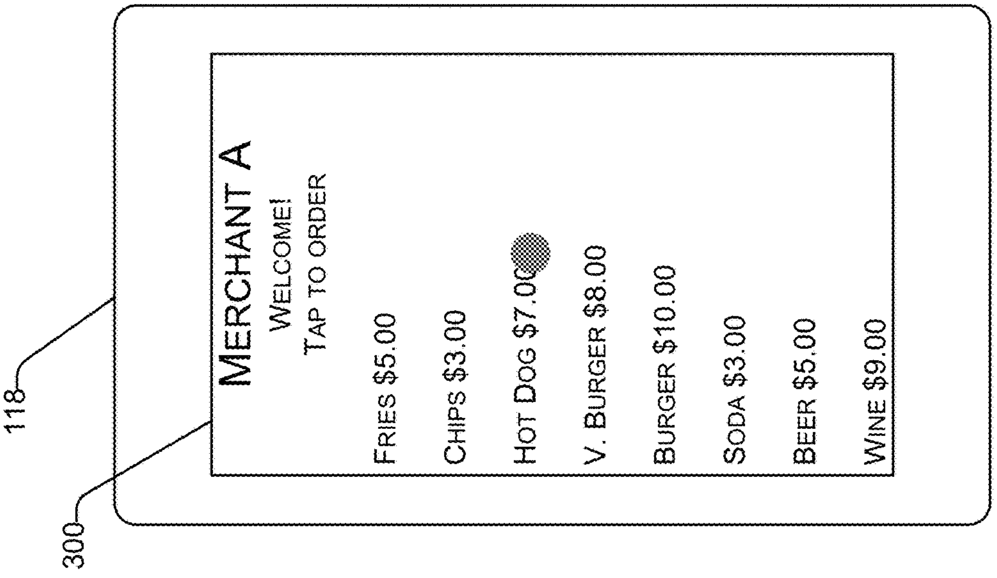
FIG. 3C illustrates yet another example GUI that can be presented via a web browser of a customer computing device by a progressive web application.
Figure 3B:
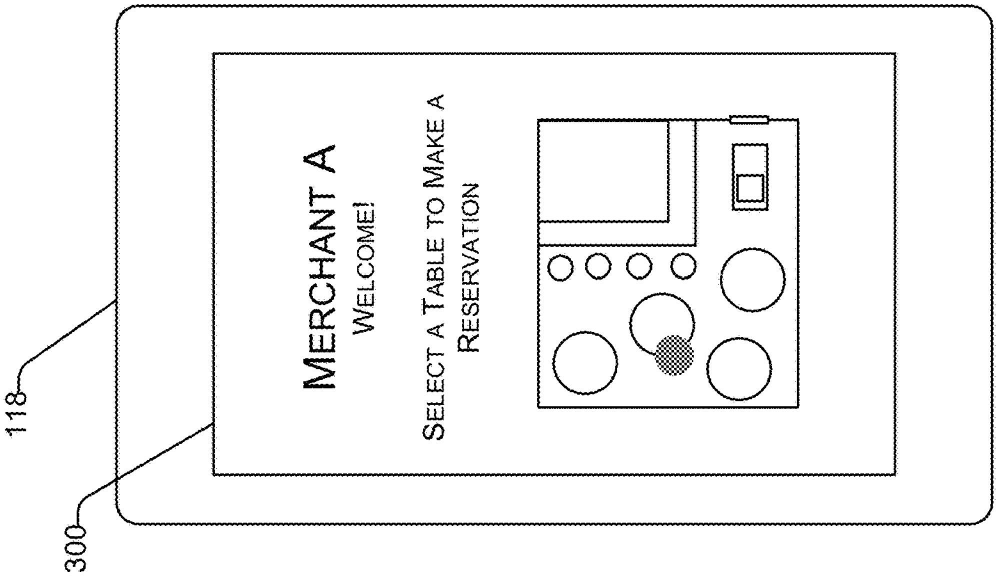
FIG. 3B illustrates another example GUI that can be presented via a web browser of a customer computing device by a progressive web application.
Figure 3A:
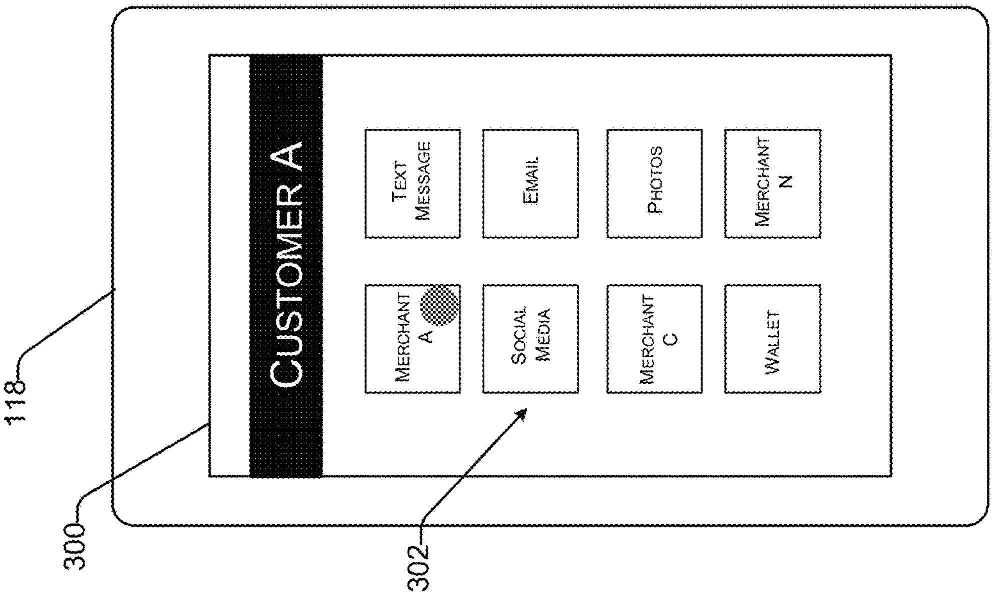
FIG. 3A illustrates an example GUI that can be presented via a web browser of a customer computing device by a progressive web application.

FIGS. 3A-3C illustrate an example GUI 300 that can be presented in association with the progressive web application 120 on the customer computing device 118. In at least one example, after the progressive web application 120 has been downloaded onto the customer computing device 118, so long as the web browser associated with the progressive web application 120 remains open, the customer 110 can continue to interact with the progressive web application 120 via the GUI 300. As described above, in some examples, content presented via the GUI 300 can be updated while the web browser associated with the progressive web application 120 remains open so that the content is up-to-date and need not be re-cached. For example, updates to inventory and/or items available via a menu can be updated via the progressive web application 120. In some examples, so long as the web browser associated with the progressive web application 120 remains open, notifications and/or other content can be pushed to the customer computing device 118 from the merchant computing device 104 and/or the server(s) 106. As an example, recommendations and/or notifications can be pushed to the customer computing device 118 so long as the web browser remains open.

In at least one example, the progressive web application 120, which can use an application shell model, can be accessible via a web browser and/or a shortcut icon that can be installed on a home screen of the customer computing device 118. That is, in at least one example, the customer 110 can opt to save and/or otherwise install the progressive web application 120 to the home screen of the customer computing device 118 (e.g., which can be an option associated with a web browser) and a shortcut icon can be associated therewith. Subsequent interaction with the shortcut icon can cause the same URL associated with the progressive web application 120 to be loaded in the web browser. As illustrated in FIG. 3A, the home screen of the customer computing device 118 can include one or more user interface elements 302 representative of different applications (e.g., native applications, web applications, progressive web applications, etc.). In at least one example, one or more of the user interface element(s) 302 can be shortcut icon(s) that when actuated, enable the customer 110 to access the corresponding application. In at least one example, if the merchant 102 is "Merchant A," as illustrated in FIG. 3A, the customer 110 can interact with the shortcut icon that is associated with the progressive web application 120 to access merchant data associated with the merchant 102 described above. That is, by detecting an actuation of the user interface element associated with "Merchant A," the web browser can load up the URL associated with the progressive web application 120 so that the customer 110 can access content associated therewith.

In at least one example, the progressive web application 120 can cause merchant data to be presented via a web browser of the customer computing device 118, as illustrated in FIG. 3B. For example, the progressive web application 120 can cause a layout of a brick-and-mortar store of the merchant 102 to be presented. In an example, the customer 110 can interact with a designated seating area represented in the layout to, for example, make a reservation for the designated seating area. In such an example, another GUI, a pop-up, an overlay, and/or the like can be presented to enable the customer 110 to input details associated with the reservation, such as the date, time, number of guests, or the like.

In at least one example, so long as the web browser associated with the progressive web application 120 remains open, the customer 110 can access the same or different merchant data at a later time, as illustrated in FIG. 3C. For example, if the customer 110 arrives at the brick-and-mortar store of the merchant 102 at his or her reservation time, the customer 110 can interact with the customer computing device 118 to access a listing of item(s) (e.g., the menu) via the GUI 300. In at least one example, the customer 110 can interact with the GUI 300 to order an item, as described above.

Figure 4:
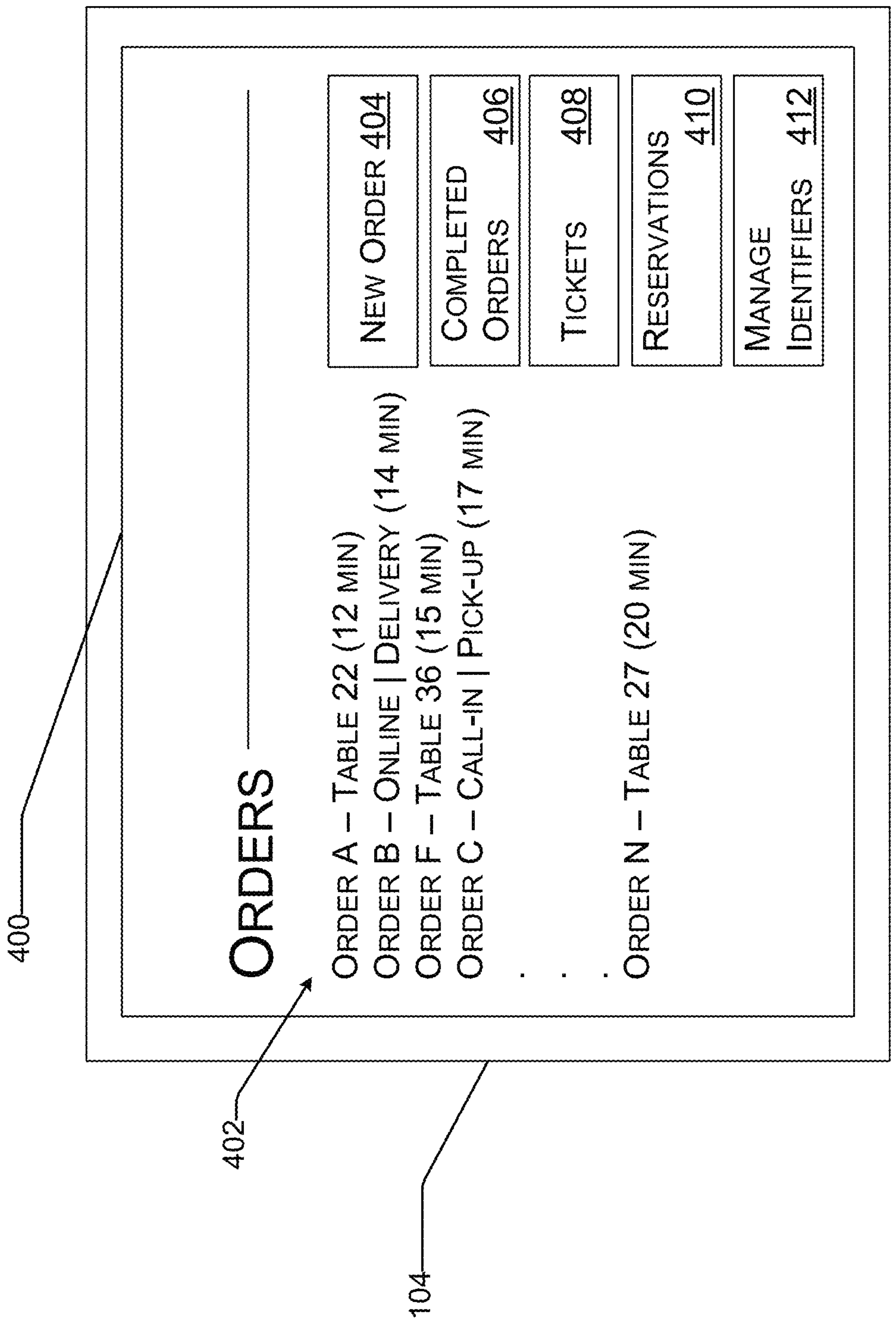
FIG. 4 illustrates an example GUI that can be presented via a merchant computing device for managing orders, as described herein.
Figure 5:
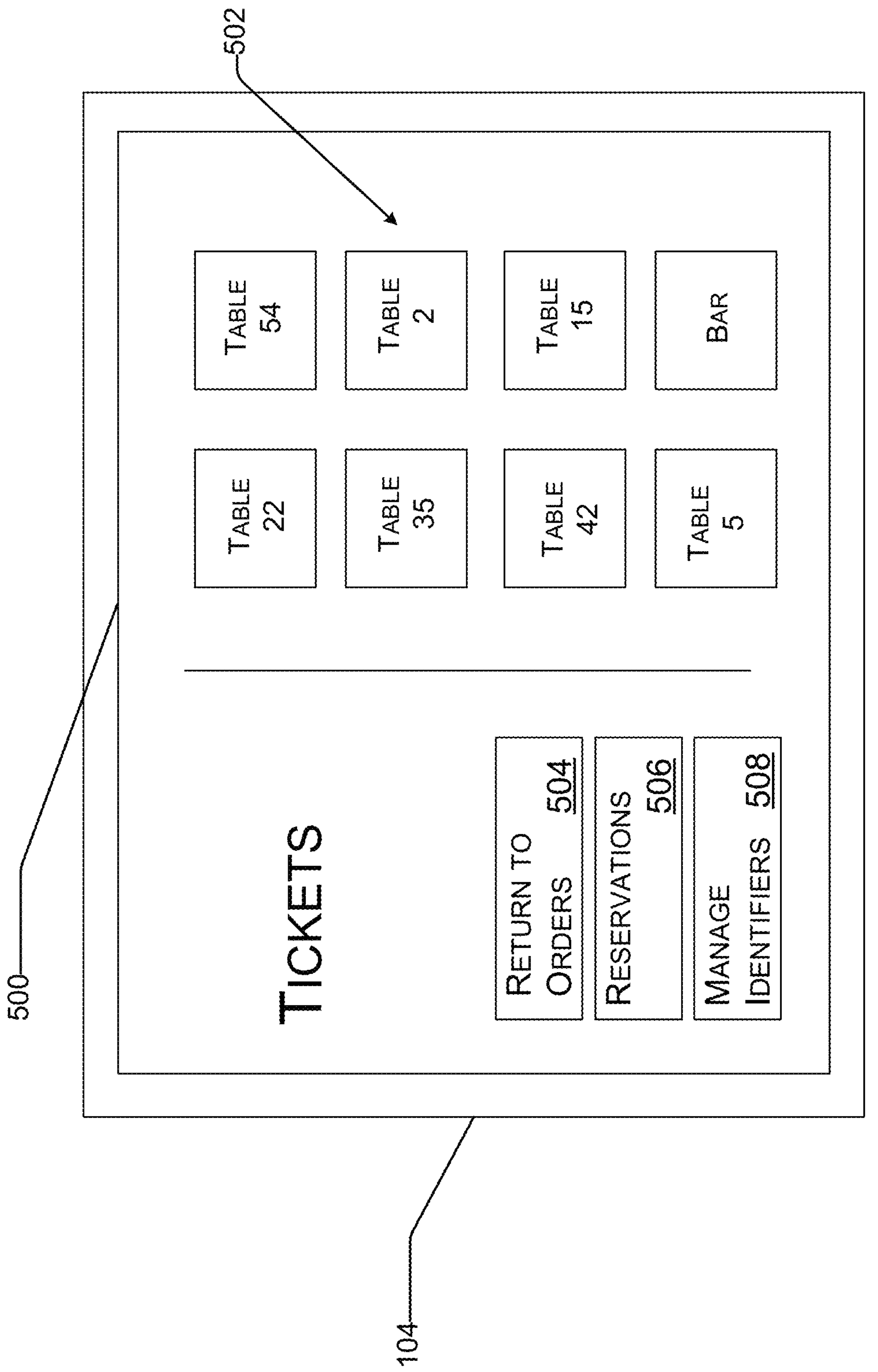
FIG. 5 illustrates an example GUI that can be presented via a merchant computing device for managing tickets, as described herein.
Figure 6:
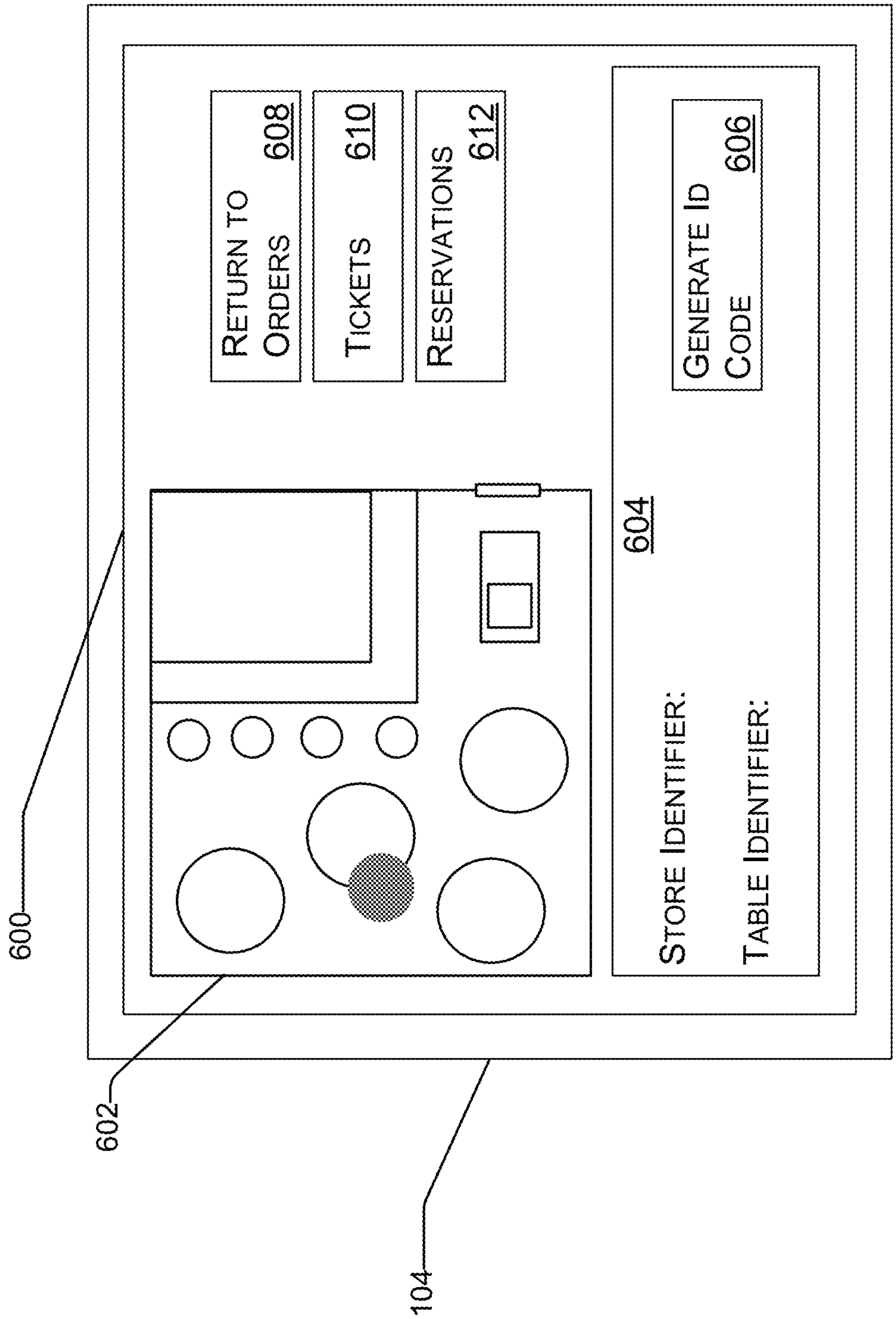
FIG. 6 illustrates an example GUI that can be presented via a merchant computing device for generating and/or managing identification codes, as described herein.

FIGS. 4-6 illustrate example GUIs that can be presented via a user interface of the merchant computing device 104. In some examples, the user interface can be availed via an application (e.g., which can be provided by the service provider). In some examples, the user interface can be availed via a web browser. The example GUIs are for illustrative purposes and should not be construed as limiting. For instance, techniques described herein can present additional or alternative content via a GUI and/or additional or alternative configurations of content via a GUI. In some examples, content can be presented via an additional or alternative user interface (e.g., a speaker, etc.).

In at least one example, the merchant 102 (or an employee, agent, etc. associated therewith) can interact with the merchant computing device 104 to manage operations of the merchant 102. In at least one example, the merchant computing device 104 can present the GUI 400 illustrated in FIG. 4, which can enable the merchant 102 to manage orders. As described above, in some examples, the merchant 102 can receive orders from one or more customers, via one or more commerce channels. In some examples, the merchant 102 can receive orders from an online store of the merchant 102, progressive web applications associated with the merchant 102, input via the GUI 400, and/or the like. In some examples, an application associated with the merchant computing device 104 (e.g., which can be provided by the service provider) can enable the merchant 102 to manage orders. In at least one example, the GUI 400 can present an order queue 402 that includes orders from the one or more commerce channels. In some examples, the order queue 402 can indicate which commerce channel each order is associated with, a location associated with the order (which, in some examples, can be provided by the identification code), a fulfillment method associated with the order, an approximated amount of time until the order is ready, and/or the like.

In some examples, the GUI 400 can include one or more selectable controls to enable the merchant 102 to access other functionalities available via the application installed thereon. For instance, the GUI 400 can include a first control 404 that can be actuated to enable the merchant 102 to generate a new order, a second control 406 that can be actuated to enable the merchant 102 to view completed orders, a third control 408 that can be actuated to enable the merchant 102 to manage reservations, a fourth control 410 that can be actuated to enable the merchant 102 to manage identifiers, etc. In some examples, actuation of one of the controls can cause the application to send an indication of the actuation to the server(s) 106 and the server(s) 106 can cause additional or alternative data to be presented via the GUI 400 to facilitate the requested operation.

FIG. 5 illustrates an example of a GUI 500 that can be presented to enable the merchant 102 to manage open tickets. As described above, in some examples, when the customer 110 orders an item, an indication of the item can be associated with a data structure that can be stored, at least temporarily by the server(s) 106. Additional items can be added to the order over time and the data structure can persist until the customer 110 and/or merchant 102 provide an indication to close the open ticket and/or an event occurs (e.g., a period of time lapses, a threshold is satisfied, etc.) such to cause the open ticket to close automatically.

The merchant 102 can access the GUI 500 to view open tickets. In some examples, a portion of the GUI 500 can include user interface elements 502 representative of individual open tickets. In some examples, each user interface element can correspond to an individual open ticket and can be selectable, such that when a user interface element associated with an open ticket is selected, data associated with the open ticket can be presented via the GUI 500. In some examples, the merchant 102 can add items to the open ticket by selecting the user interface element associated therewith. Further, in some examples, the merchant 102 can select individual user interface elements to initiate a payment flow or otherwise settle payment associated therewith.

In some examples, the GUI 500 can include one or more selectable controls to enable the merchant 102 to access other functionalities available via the application installed thereon. For instance, the GUI 500 can include a first control 504 that can be actuated to enable the merchant 102 to return to the orders user interface as described in FIG. 4 above, a second control 506 that can be actuated to enable the merchant 102 to manage reservations, a third control 508 that can be actuated to enable the merchant 102 to manage identifiers, etc. In some examples, actuation of one of the controls can cause the application to send an indication of the actuation to the server(s) 106 and the server(s) 106 can cause additional or alternative data to be presented via the GUI 500 to facilitate the requested operation.

FIG. 6 illustrates an example of a GUI 600 that can be presented to enable the merchant 102 to manage identifiers. As described above, a merchant 102 can interact with the merchant computing device 104 to generate identification codes or otherwise associate identification(s) of designated seating areas and/or brick-and-mortar stores with identification codes. In an example, a graphical representation 602 of a layout of a brick-and-mortar store of the merchant 102 can be presented via the user interface 600. In some examples, the merchant 102 can interact with the GUI 600 to identify a designated seating area (e.g., a table, bar stool, etc.) associated with the brick-and-mortar store. In at least one example, by selecting the designated seating area, an identifier associated with the designated seating area (i.e., table identifier) and, in some examples, the brick-and-mortar store (i.e., store identifier), can be populated in a section 604 of the GUI 600 that enables the merchant 102 to generate an identification code (ID code) for the designated seating area. In some examples, the merchant 102 can manually enter identification information associated with designated seating areas and/or brick-and-mortar stores via the section 604 of the GUI 600. In at least one example, when identification information has been input, the merchant 102 can actuate a first control 606 to cause the identification code to be generated. In an example, the application can send an indication of the actuation of the first control 606 to the server(s) 106, which can generate the identification code. That is, the server(s) 106 can generate an identification code that is specific to the identifier(s) provided. In some examples, the merchant computing device 104 can generate an identification code that is specific to the identifier(s), without involving the server(s) 106. The identification code can be associated with the identifier(s), for example, in a datastore, as described below.

In some examples, the merchant computing device 104 can receive the identification code and print the identification code so that the identification code can be associated with the designated seating area and/or the brick-and-mortar store (e.g., as illustrated in FIG. 1). In some examples, the identification code can be printed on paper, a sticker, a magnet, a placard, or other physical item to be positioned proximate the designated seating area and/or the brick-and-mortar store. In some examples, the identification code can be made available via an electronic device located proximate the designated seating area and/or the brick-and-mortar store.

In some examples, an identification code can be associated with an identification device, such as an RFID device. In such examples, the server(s) 106 and/or merchant computing device 104 may not generate the identification code but instead can associate the identification(s) of the designated seating area and/or the brick-and-mortar store with the identification code associated with the identification device.

In such an example, the identification device can be positioned proximate the designated seating area and/or the brick-and-mortar store.

As described above, in some examples, responsive to the customer computing device 118 scanning or otherwise reading the identification code at the physical location with which it is associated, the server(s) 106 can cause the progressive web application 120 to be downloaded onto the customer computing device 118. In some examples, responsive to the customer computing device 118 scanning or otherwise reading the identification code at the physical location with which it is associated, the server(s) 106 can send merchant data to the customer computing device 118. In some examples, the merchant data can comprise a menu of items such that an ordering page is presented via a web browser on the customer computing device 118 (by the progressive web application 120). In some examples, the merchant data can comprise a layout of the brick-and-mortar store such that a reservation page is presented via a web browser on the customer computing device 118 (by the progressive web application 120). In such examples, responsive to the customer computing device 118 scanning or otherwise reading the identification code at the physical location with which it is associated, the server(s) 106 can cause ordering pages, reservation pages, or the like to be rendered on the customer computing device 118 (e.g., via the progressive web application 120).

In some examples, the service provider can leverage merchant data associated with the merchant 102 to prompt the merchant 102 to generate new identification codes and/or to automatically generate new identification codes for the merchant 102. For example, if the merchant 102 adds a new designated seating area to a brick-and-mortar store, the server(s) 106 can detect that a new designated seating area has been added and can prompt the merchant 102 to generate a new identification code for the new designated seating area and/or to automatically generate a new identification code for the merchant 102.

Like the GUIs in FIGS. 4 and 5, the GUI 600 can include one or more selectable controls to enable the merchant 102 to access other functionalities available via the application installed thereon. For instance, the GUI 600 can include a second control 608 that can be actuated to enable the merchant 102 to return to the orders user interface as described in FIG. 4 above, a third control 610 that can be actuated to enable the merchant 102 to manage tickets as described in FIG. 5 above, a fourth control 612 that can be actuated to enable the merchant 102 to manage reservations, etc. In some examples, actuation of one of the controls can cause the application to send an indication of the actuation to the server(s) 106 and the server(s) 106 can cause additional or alternative data to be presented via the GUI 600 to facilitate the requested operation.

FIGS. 2-6 describe various GUIs that can be presented in association with techniques described herein. In at least one example, users (e.g., the customer 110 and/or the merchant 102) can interact with the GUIs to provide inputs which can be detected by computing components associated therewith and sent to the server(s) 106 via the network(s) 108. In some examples, a user can select, actuate, or otherwise interact with a user interface element presented via a GUI. Such selections, actuations, or other interactions can be provided via a touch input, spoken input, mouse input, keyboard control, or the like. For the purpose of this discussion, user interface elements can comprise text elements, graphical elements, pictures, icons, selectable elements, or any other object that can be presented via a GUI.

Figure 12:
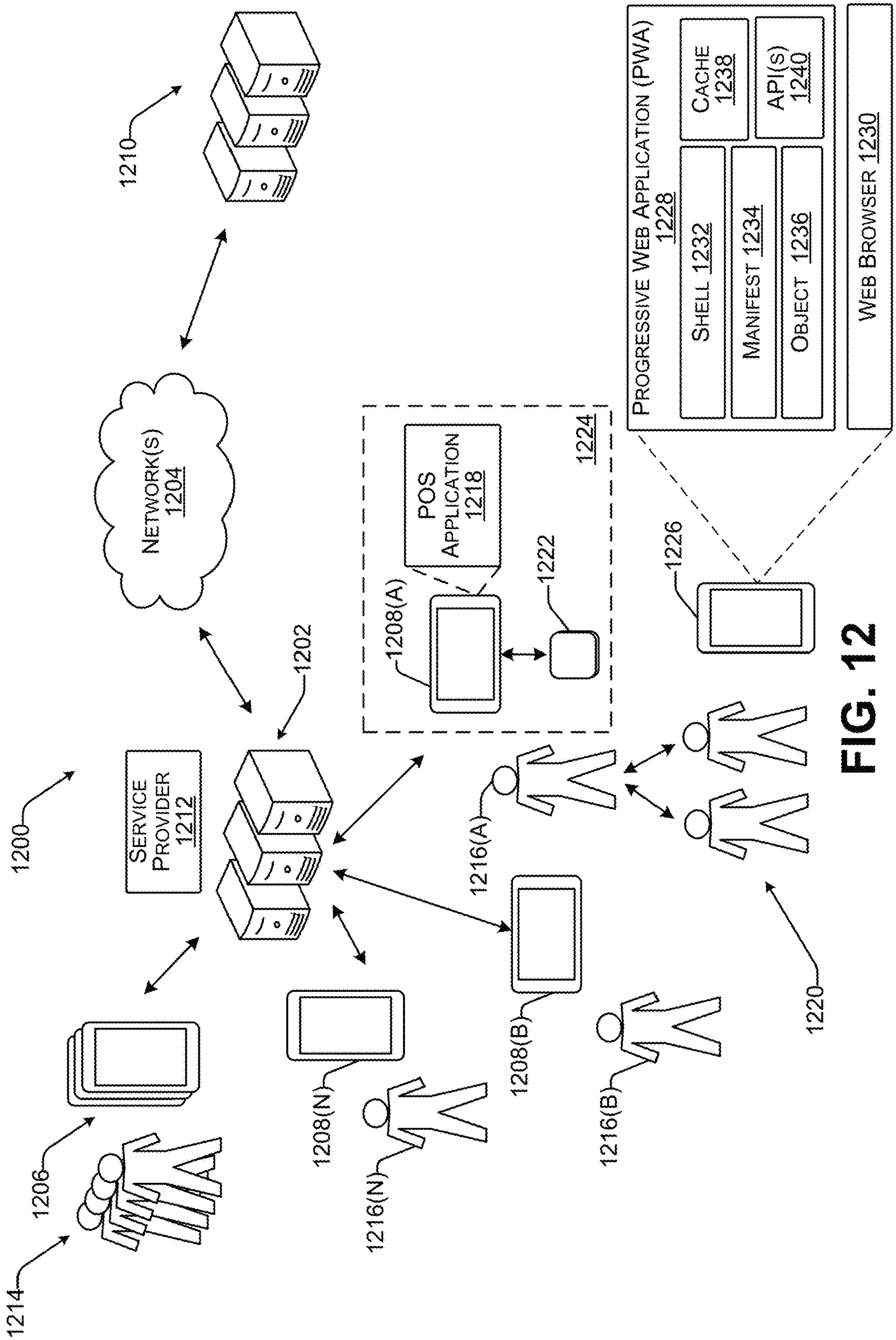
FIG. 12 illustrates an example merchant ecosystem for facilitating, among other things, techniques described herein.
Figure 13:
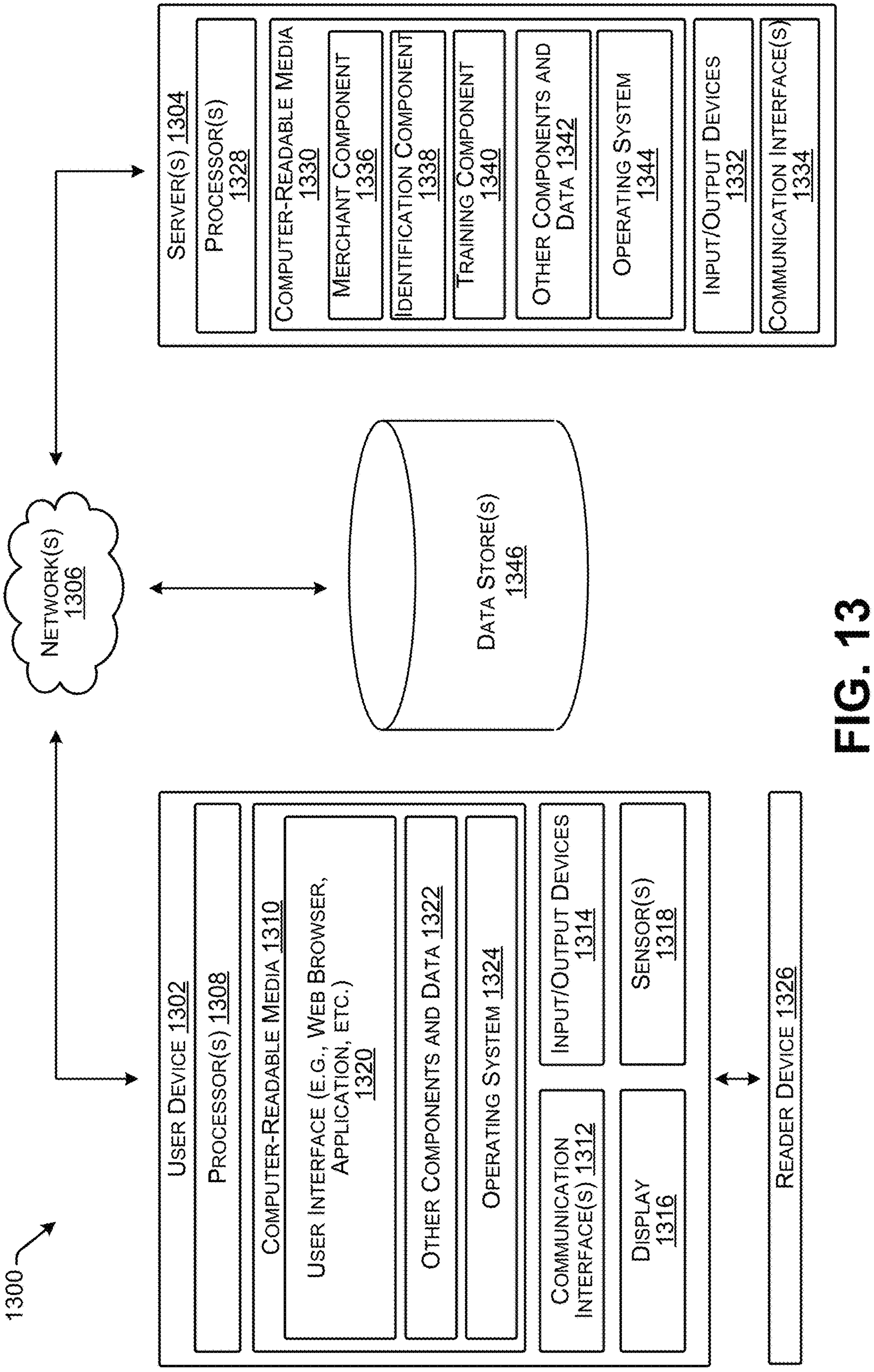
FIG. 13 illustrates additional details associated with individual components of the merchant ecosystem described above in FIG. 12.

FIGS. 7-11 are flowcharts showing example processes involving techniques as described herein. The processes illustrated in FIGS. 7-11 are described with reference to FIG. 1 for convenience and ease of understanding. FIGS. 12 and 13 provide additional details associated with the components of FIG. 1 above. The processes illustrated in FIGS. 7-11 are not limited to being performed using components described in FIG. 1, and such components are not limited to performing the processes illustrated in FIGS. 7-11.

The processes 700-1100 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 700-1100 can be combined in whole or in part with each other or with other processes.

Figure 7:
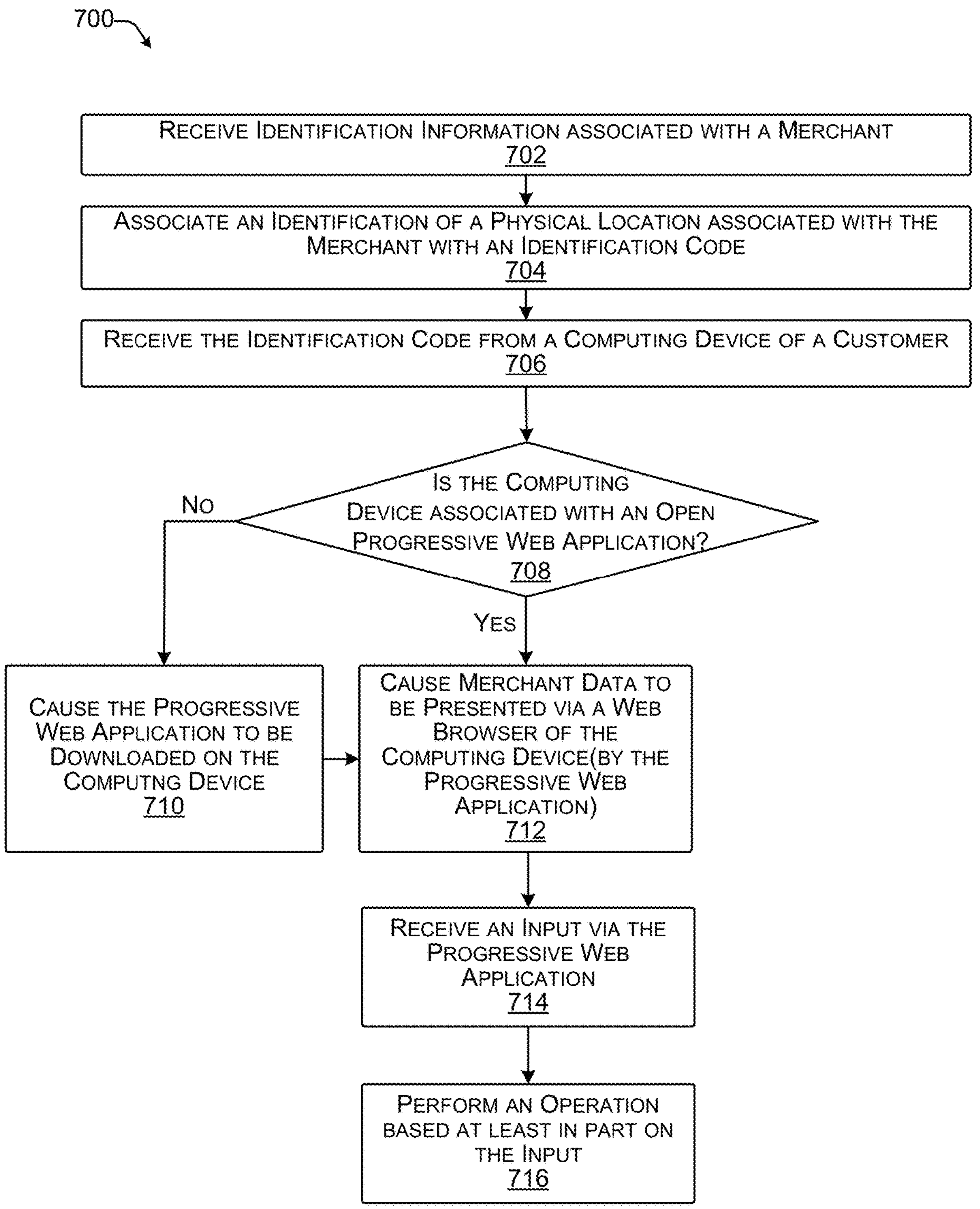
FIG. 7 illustrates an example process for receiving an input via a progressive web application and performing an operation based at least in part on the input, as described herein.

FIG. 7 illustrates an example process 700 for receiving an input via a progressive web application and performing an operation based at least in part on the input, as described herein.

Block 702 illustrates receiving identification information associated with a merchant. In at least one example, the server(s) 106 can receive identification information associated with a merchant, such as the merchant 102. In at least one example, the identification information can identify physical location(s) (e.g., designated seating areas and/or brick-and-mortar stores) associated with the merchant 102. For instance, individual tables, bar stools, or the like can be associated with identification information. If the merchant 102 has multiple brick-and-mortar stores (i.e., with different locations), individual of the brick-and-mortar stores can be associated with identification information. In some examples, the merchant 102 can manually input identification information, for example, via a GUI such as the GUI illustrated in FIG. 6 above. In some examples, the server(s) 106 can receive information that a new designated seating area and/or brick-and-mortar store has been associated with the merchant 102 and can determine identification information without such information being input by the merchant 102.

Block 704 illustrates associating an identification of a physical location associated with the merchant with an identification code. In at least one example, the server(s) 106 can associate an identification of a physical location (e.g., a designated seating area and/or brick-and-mortar store) with an identification code. In some examples, an identification code can be associated with an identification device, such as an RFID device. In such examples, the server(s) 106 may associate the identification(s) of the designated seating area and/or the brick-and-mortar store with the identification code associated with the identification device. In at least one example, the identification device can be positioned proximate the designated seating area and/or the brick-and-mortar store.

In some examples, the server(s) 106 can generate the identification code based at least in part on identifier(s)

associated with the designated seating area and/or the brick-and-mortar store. In at least one example, the server(s) 106 can generate an identification code that is unique to the identifier(s). In some examples, the identification code can be a QR code, a barcode, a string of letters and/or number, or the like. In some examples, the server(s) 106 can send the identification code to the merchant computing device 104. The merchant computing device 104 can receive the identification code and, in some examples, can print, or cause to be printed, the identification code so that the identification code can be associated with the designated seating area and/or the brick-and-mortar store (e.g., as illustrated in FIG. 1). In some examples, the identification code can be printed on paper, a sticker, a magnet, a placard, or other physical item to be positioned proximate the designated seating area and/or the brick-and-mortar store. In some examples, the identification code can be made available via an electronic device located proximate the designated seating area and/or the brick-and-mortar store.

Block 706 illustrates receiving the identification code from a computing device of a customer. In at least one example, the customer 110 can operate a computing device (i.e., customer computing device 118) to scan, or otherwise read, the identification code. In some examples, the customer computing device 118 can include a reader device that can read the identification code. In some examples, an identification code can be manually input via a user interface presented on the customer computing device 118. In at least one example, the customer computing device 118 can send an indication of the identification code to the server(s) 106, via the network(s) 108. In at least one example, the server(s) 106 can receive the identification code.

Block 708 illustrates determining whether the computing device is associated with an open progressive web application. In at least one example, the server(s) 106 can determine whether the computing device that sent the identification code (e.g., the customer computing device 118) has a web browser associated with a progressive web application open. In some examples, if the customer computing device 118 is associated with an open progressive web application, the indication of the identification code can be associated with a cookie, previously provided by the server(s) 106, or the like, indicating that the customer computing device 118 is associated with an open progressive web application. If the customer computing device 118 does not have a web browser associated with the progressive web application open (and thus the customer computing device 118 is not associated with an open progressive web application), the server(s) 106 can cause the progressive web application to be downloaded on the customer computing device 118, as illustrated at operation 710. In some examples, a URL associated with the progressive web application 120 can be provided to the customer computing device 118, which can be activated by the customer 110, and/or the customer 110 can manually input the URL into a web browser to download the progressive web application 120. Details associated with the progressive web application are described above.

Block 712 illustrates causing the merchant data to be presented via a web browser of the computing device (by the progressive web application). In at least one example, based at least in part on determining that the customer computing device 118 has the progressive web application 120 downloaded and a web browser associated therewith open, the server(s) 106 can send merchant data to the progressive web application 120 for presentation via the web browser of the customer computing device 118. That is, in at least one example, the progressive web application 120 can cause merchant data to be presented via the web browser of the customer computing device 118. In some examples, such merchant data can be a menu of items, a layout of the brick-and-mortar store of the merchant 102, or the like.

As described above, in some examples, customer information can be saved based on web browser/cookie session parameters, thereby allowing such customer information to remain attached. If a customer provides an identifier (e.g., a customer identifier, a phone number, an email address, etc.), payment data, etc., such information can be saved. In some examples, customers can provide a confirmation authentication using a code or other means for authentication. As such, so long as the web browser remains open, content associated with the progressive web application 120 can be accessible to the customer 110. For instance, the customer 110 can view/utilize presets previously made (e.g., location, previous orders/reorders, account subscriptions, address, payment, etc.) and/or can continue to interact with the content provided by the progressive web application 120.

Block 714 illustrates receiving an input via the progressive web application. In at least one example, the customer 110 can interact with the customer computing device 118 (e.g., a user interface associated therewith) to provide an input, an indication of which can be transmitted to the server(s) 106. As described above with reference to FIGS. 2A-2D and 3A-3E, in some examples, such input can be associated with an order for an item from a menu of item(s) offered for sale by the merchant 102, a reservation for a designated seating area, gratuity, feedback, or the like. In at least one example, the server(s) 106 can receive an indication of the input and can perform an operation based on such input, as illustrated at block 716. For instance, if the input is associated with an order for an item, the server(s) 106 can associate the item with a data structure, which in some examples can be an open ticket data structure. In some examples, the server(s) 106 can transmit an indication of the order to the merchant computing device 104, a kitchen display system, or the like to enable the merchant 102 to fulfill the order. In another example, if the input is associated with a reservation, the server(s) 106 can schedule the reservation. Further, if the input is associated with payment data, the server(s) 106 can process payment using the payment data. In at least one example, if the input is feedback, the feedback can be stored in a datastore associated with the server(s) 106 and, in some examples, can be provided to the merchant 102 via the merchant computing device 104.

Figure 8:
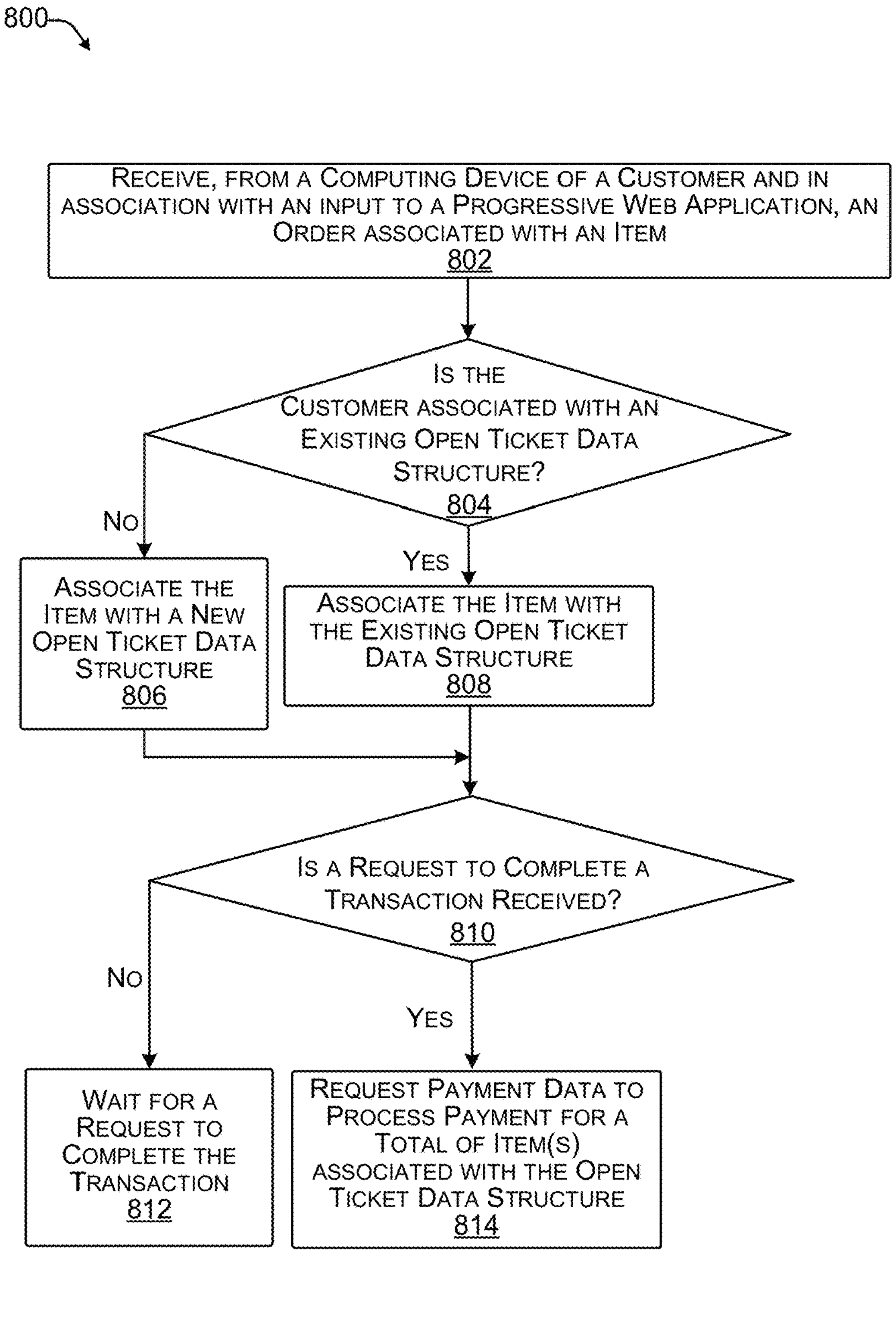
FIG. 8 illustrates an example process for processing payment associated with an open ticket, as described herein.

FIG. 8 illustrates an example process 800 for processing payment associated with an open ticket, as described herein.

Block 802 illustrates receiving, from a computing device of a customer and in association with an input to a progressive web application, an order associated with an item. As described above, the progressive web application 120 can cause merchant data to be presented via the web browser. In some examples, such merchant data can include a menu of items for sale by the merchant 102. FIGS. 2A and 2B, above, illustrate an example GUI 200 that includes user interface elements 204 representative of items offered for sale by the merchant 102. In at least one example, the customer 110 can interact with the customer computing device 118 to select an item to order. In such an example, the progressive web application 120 can detect an input indicating the selection and can send an indication of the selection to the server(s) 106. The server(s) 106 can receive the order, or indication thereof, from the customer computing device 118. In at least one example, if an order is received via an ordering page presented responsive to the customer 110 scanning or otherwise reading an identification code associated with a physical location (e.g., a designated seating area and/or a brick-and-mortar store), the order can be associated with identifier(s) associated with the physical location so that the merchant 102 knows where to deliver items associated with the order.

Block 804 illustrates determining whether the customer is associated with an existing open ticket data structure. In some examples, the server(s) 106 can generate a data structure with which an indication of the item can be associated. In some examples, the data structure can represent an order or a ticket. In some examples, the data structure can be stored, at least temporarily, such that indications of one or more additional items can be added to the data structure over time. In such examples, the data structure can represent an "open ticket," which can persist until the customer 110 and/or merchant 102 provide an indication to close the open ticket and/or an event occurs (e.g., a period of time lapses, a threshold is satisfied, etc.) such to cause the open ticket to close automatically.

In at least one example, the server(s) 106 can determine whether the customer is associated with an existing open ticket data structure. In some examples, the order, or indication thereof, can be associated with an identifier associated with the customer computing device 118, the customer 110, a physical location of the customer 110 (e.g., a table number, a table identifier, etc.), and/or the like. In at least one example, the server(s) 106 can determine whether the identifier is associated with an existing open ticket data structure. If the customer 110 is not associated with an existing open ticket data structure, the server(s) 106 can generate a new open ticket data structure and can associate the item with the new open ticket data structure, as illustrated at block 806. The new open ticket data structure can persist until the customer 110 and/or merchant 102 provide an indication to close the open ticket and/or an event occurs (e.g., a period of time lapses, a threshold is satisfied, etc.) such to cause the open ticket to close automatically. In some examples, the server(s) 106 can request or otherwise access payment data from the customer 110 and the server(s) 106 can send an authorization request to authorize the payment data for at least a portion of the cost of the item(s) associated with the order.

If the customer 110 is associated with an existing open ticket data structure, the server(s) 106 can associate the item with the existing open ticket data structure, as illustrated at block 808. In some examples, if the existing open ticket data structure is associated with payment data and/or an authorization request, in some examples, the server(s) 106 can send another authorization request to authorize the payment data for at least a portion of the cost of the item(s) associated with the order. In some examples, if the existing open ticket data structure is not associated with payment data, the server(s) 106 can request or otherwise access payment data from the customer 110 and the server(s) 106 can send an authorization request to authorize the payment data for at least a portion of the cost of the item(s) associated with the order.

Block 810 illustrates determining whether a request to complete a transaction is received. As described above, the open ticket data structure can persist until the customer 110 and/or merchant 102 provide an indication to close the open ticket and/or an event occurs (e.g., a period of time lapses, a threshold is satisfied, etc.) such to cause the open ticket to close automatically. In at least one example, the server(s) 106 can determine whether an indication to close the open ticket has been received from either the customer computing device 118 or the merchant computing device 104. If no request is received, the server(s) 106 can store the open ticket data structure until a request to complete the transaction is received, as illustrated in block 812, and/or an event occurs (e.g., a period of time lapses, a threshold is satisfied, etc.).

Block 814 illustrates requesting payment data to process payment for a total of item(s) associated with the open ticket data structure. In at least one example, if a request to complete the transaction is received, the server(s) 106 can determine a total cost of the transaction associated with the open ticket data structure (e.g., total cost of the item(s) associated with the open ticket) and can send a request for payment data to the customer computing device 118 (e.g., via the progressive web application 120) and/or the merchant computing device 104 (e.g., via the application, via a web browser, or the like).

In at least one example, as described above with reference to FIG. 2C, the progressive web application 120 can cause a payment user interface to be presented via the GUI 200. In at least one example, the customer 110 can interact with the GUI 200 to provide payment data. For example, the customer 110 can select a selectable control 204 to provide such payment data. In some examples, the customer 110 can provide payment data via a secure portal (e.g., via manual input), which can be presented responsive to selection of the selectable control 204. In such an example, the payment data can be transmitted securely to the server(s) 106 for payment processing. In some examples, the customer computing device 118 can include a reader device (e.g., a near-field communication (NFC) reader) and the customer 110 can cause an interaction between a payment instrument and the customer computing device 118 such that the customer computing device 118 can obtain the payment data from the payment instrument. In some examples, the customer 110 can access stored payment data (e.g., stored in a wallet application associated with the customer computing device 118) that can be provided to the server(s) 106. In some examples, the customer 110 can utilize a third-party payment mechanism (e.g., Apple Pay, Google Pay, etc.) to provide payment data to the server(s) 106 for payment processing.

In some examples, the customer 110 can provide payment data to the merchant 102, via the merchant computing device 104. For instance, the customer 110 can cause an interaction between a payment instrument and a reader device associated with the merchant computing device 104. In such an example, the merchant computing device 104 can send the payment data to the server(s) 106 for payment processing. In some examples, the customer 110 can store payment data with the merchant 102 and/or the service provider. In such an example, the customer 110 can provide an identifier to identify themselves and the server(s) 106 can access stored payment data that corresponds with the identifier. This can be called a "card-on-file" transaction.

The server(s) 106 can receive the payment data and can process payment for the transaction using the payment data. In at least one example, the server(s) 106 can transmit authorization and/or capture request(s) to a payment service associated with the payment data to determine whether the payment data (e.g., the payment instrument associated therewith) is authorized for the transaction. Additional details associated with payment processing are described below.

While FIG. 8 describes payment data being requested after a request to complete a transaction is received, as described above, the server(s) 106 can receive payment data at various times, such as prior to when the customer 110 arrives at a brick-and-mortar store of the merchant 102, at the time the customer 110 orders an item, after the customer 110 orders the item, after the customer 110 leaves the brick-and-mortar store of the merchant 102, etc. That is, payment data can be provided before, during, or after an order. Furthermore, an open ticket can be associated with orders received from the customer computing device 118 and/or the merchant computing device 104. That is, when a new order is received, if the new order is associated with a customer identifier, customer device identifier, physical location associated with the merchant 102, etc., that is associated with an existing open ticket, the server(s) 106 can associate the new order with the existing open ticket.

Figure 9:
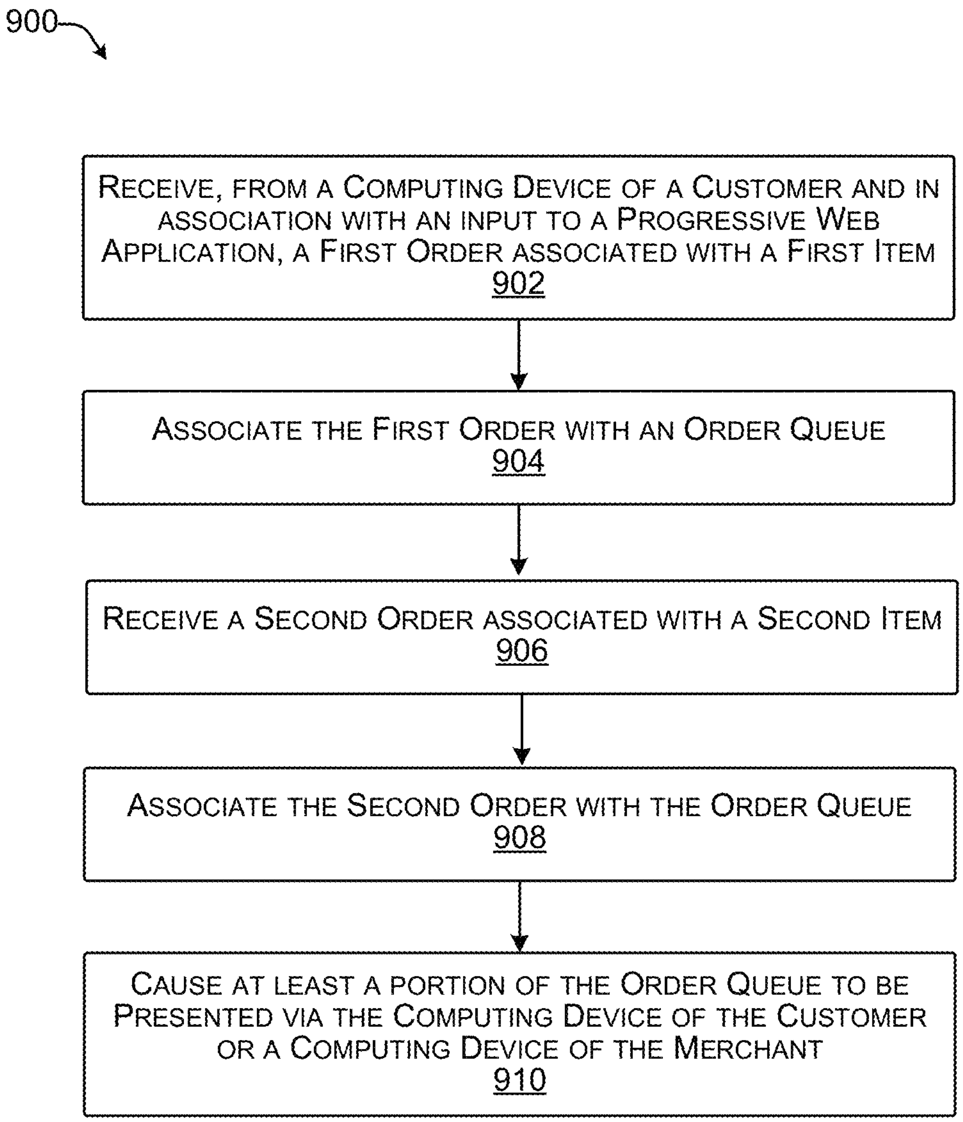
FIG. 9 illustrates an example process for generating an order queue based at least in part on orders received via different commerce channels.

FIG. 9 illustrates an example process 900 for generating an order queue based at least in part on orders received via different commerce channels.

Block 902 illustrates receiving, from a computing device of a customer and in association with an input to a progressive web application, a first order associated with a first item. As described above, the progressive web application 120 can cause merchant data to be presented via the web browser. In some examples, such merchant data can include a menu of items for sale by the merchant 102. FIGS. 2A and 2B, above, illustrate an example GUI 200 that includes user interface elements 204 representative of items offered for sale by the merchant 102. In at least one example, the customer 110 can interact with the customer computing device 118 to select an item to order. In such an example, the progressive web application 120 can detect an input indicating the selection and can send an indication of the selection to the server(s) 106. The server(s) 106 can receive the order, or indication thereof, from the customer computing device 118.

Block 904 illustrates associating the first order with an order queue. In at least one example, the server(s) 106 can add the first order to a queue (e.g., an "order queue") with one or more other orders that can be received via the same commerce channel (e.g., via the progressive web application 120 on the customer computing device 128) and/or additional commerce channels and/or alternative commerce channels (e.g., online or in-store). That is, in some examples, a queue can be associated with orders received from progressive web applications, online stores, applications associated with merchant computing devices, and/or the like and can be integrated into a single queue of orders to be fulfilled by the merchant 102. A non-limiting example of an order queue is described above with reference to FIG. 4.

Block 906 illustrates receiving a second order associated with a second item. In at least one example, the server(s) 106 can receive a second order. In some examples, the second order can be from the customer computing device 118 (e.g., via the progressive web application 120). In some examples, the second order can be from a different customer, a different commerce channel, etc. In at least one example, the second order can be associated with a different fulfillment method than the first order. In at least one example, the server(s) 106 can associate the second order with the order queue.

Block 910 illustrates causing at least a portion of the order queue to be presented via the computing device of the customer or a computing device of the merchant. In at least one example, the server(s) 106 can cause at least a portion of the order queue to be presented via the customer computing device 118 or the merchant computing device 104. For example, a portion of the order queue can be presented to the customer 110 to notify the customer 110 where their order is in the queue, an amount of time expected before their order is fulfilled, or the like. In at least one example, a portion of the order queue can be presented to the merchant 102 to enable the merchant 102 to track orders, manage orders, or otherwise understand which orders are in the process of being prepared, which orders have been fulfilled, etc. In some examples, a portion of the order queue can be presented via a kitchen display system, front-of-house computing devices, back-of-house computing devices, or the like. In at least one example, if an order is received via an ordering page presented responsive to the customer 110 scanning or otherwise reading an identification code associated with a physical location (e.g., a designated seating area and/or a brick-and-mortar store), the order can be associated with identifier(s) associated with the physical location so that the merchant 102 knows where to deliver items associated with the order.

Figure 10:
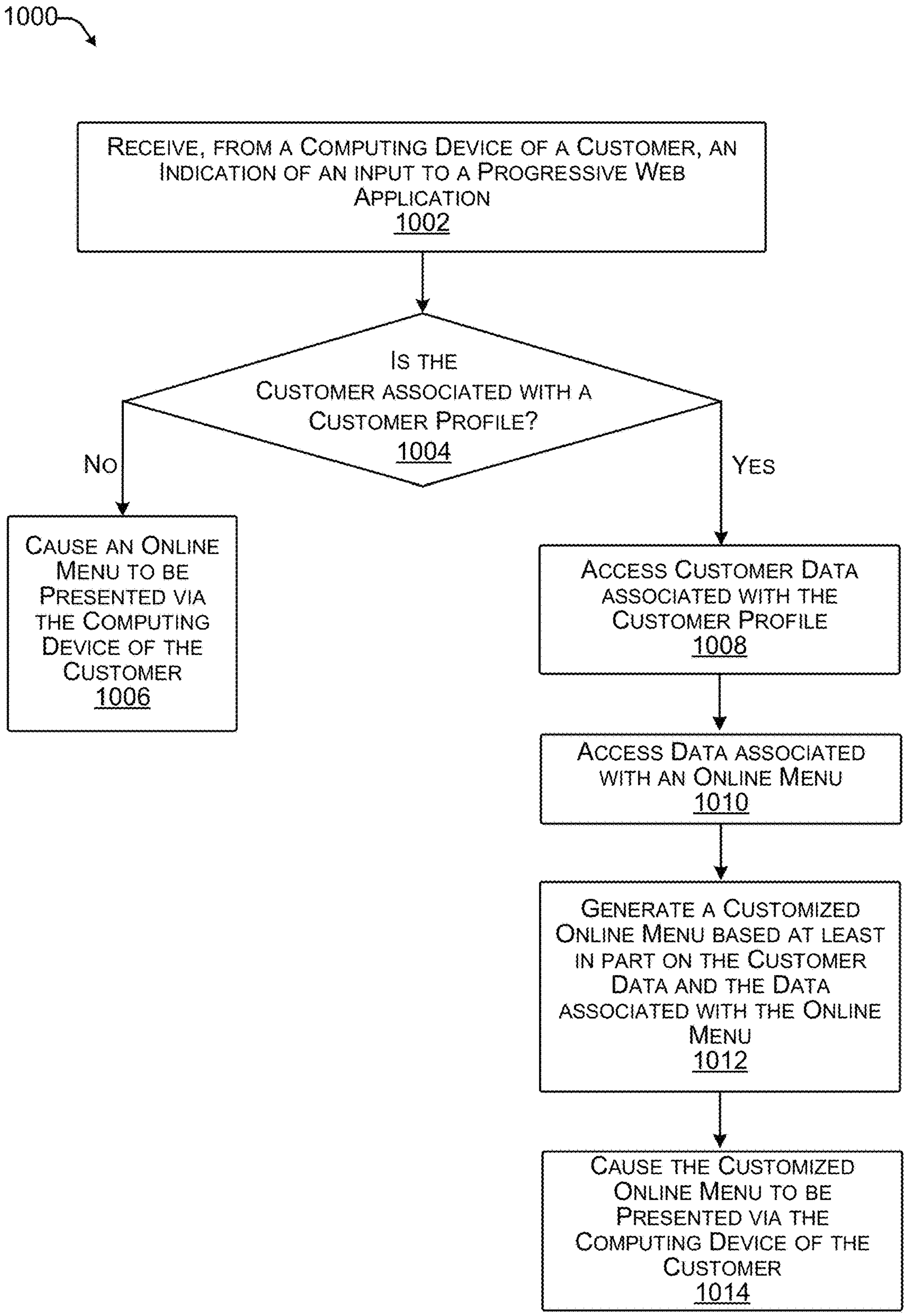
FIG. 10 illustrates an example process for outputting merchant data, such as an online menu, by a progressive web application and via a web browser of a customer, wherein the merchant data and/or the presentation thereof can be modified based at least in part on data associated with the customer, as described herein.

FIG. 10 illustrates an example process 1000 for outputting merchant data, such as an online menu, by a progressive web application and via a web browser of a customer, wherein the merchant data and/or the presentation thereof can be modified based at least in part on data associated with the customer, as described herein.

Block 1002 illustrates receiving, from a computing device of a customer, an indication of an input to a progressive web application. As described above, the customer 110 can interact with a user interface of the customer computing device 118 to provide input that can be detected by the progressive web application 120. In at least one example, an indication of the input can be sent by the progressive web application 120 to the server(s) 106. In some examples, the indication can be associated with an identifier of the customer 110 (e.g., customer identifier, phone number, email address, etc.), the customer computing device 118, or the like. In some examples, the indication can be associated with a cookie previously provided by the server(s) 106. That is, customer information can be saved based on web browser/cookie session parameters thereby allowing customer information (e.g., identification information, payment information, etc.) to remain attached. The server(s) 106 can receive the indication of the input from the customer computing device 118.

Block 1004 illustrates determining whether the customer is associated with a customer profile. In at least one example, the server(s) 106 can receive the indication of the input that is associated with the identifier, cookie, or the like and can determine whether the identifier, cookie, or the like is associated with a customer profile. That is, the server(s) 106 can access a datastore of customer profiles to determine whether the identifier, cookie, or the like is associated with a customer profile. If the identifier, cookie, or the like is not associated with a customer profile, the server(s) 106 can cause an online menu to be presented via the customer computing device 118, as illustrated at block 1006. That is, if the identifier, cookie, or the like is not associated with a customer profile, the server(s) 106 can cause a default or standard online menu to be presented via the customer computing device 118.

Block 1008 illustrates accessing customer data associated with the customer profile. In at least one example, if the identifier, cookie, or the like is associated with a customer profile, the server(s) 106 can access data associated with the customer profile (i.e., customer data). Additional details associated with customer profiles and/or customer data are described below.

Block 1010 illustrates accessing data associated with an online menu. In at least one example, data associated with the online menu can be stored in a datastore. For instance, an inventory can indicate which item(s) offered for sale by the merchant 102 are to be presented via an online menu. That is, such item(s) can be associated with an indicator or the like such that when an online menu is requested, the server(s) 106 can access such data to generate the online menu for presentation. In at least one example, the server(s) 106 can access the data associated with the online menu.

Block 1012 illustrates generating a customized online menu based at least in part on the customer data and the data associated with the online menu. In at least one example, the server(s) 106 can generate a customized online menu for the customer, based at least in part on the customer data. That is, if the customer data indicates that the customer does not like fish (e.g., previous transactions indicate that the customer 110 has not purchased fish, the customer 110 had explicitly indicated that they do not like fish, etc.), the server(s) 106 can omit fish offering from the online menu. Or, if the customer data indicates that the customer 110 generally spends within a price range, the server(s) 106 can include items within the price range and exclude items that are outside of the price range. In some examples, the order of items presented via the menu can be determined based at least in part on the customer data, the configuration of the online menu can be determined based at least in part on the customer data, or the like.

Block 1014 illustrates causing the customized online menu to be presented via the computing device of the customer. In at least one example, the server(s) 106 can send the customized online menu to the customer computing device 118 such that the online menu can be presented via a web browser (e.g., by the progressive web application 120) associated with the customer computing device 118.

While FIG. 10 references menus, in some examples, similar techniques can be implemented for customizing other types of data provided to the customer computing device 118. Furthermore, by determining the identification of the customer 110, the server(s) 106 can provide personalized recommendations for the customer 110 (e.g., based at least in part on merchant data, etc.), can surface recommendations to the merchant 102 that are particular to the customer 110, send marketing to the customer 110 via the progressive web application 120, and/or the like.

Figure 11:
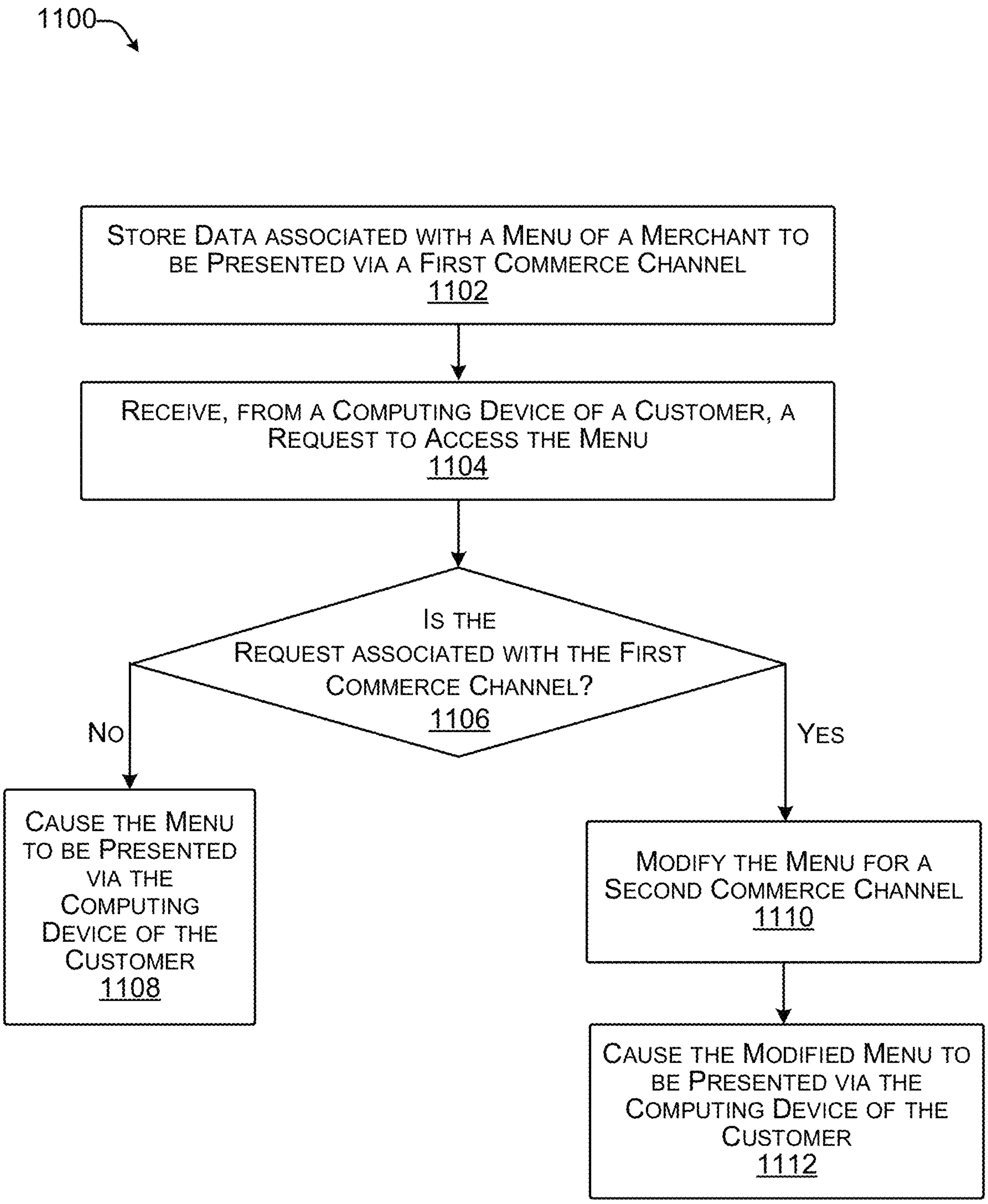
FIG. 11 illustrates an example process for modifying a menu that is presented via a first commerce channel for presentation on a second commerce channel, as described herein.

FIG. 11 illustrates an example process 1100 for modifying a menu that is presented via a first commerce channel for presentation on a second commerce channel, as described herein.

Block 1102 illustrates storing data associated with a menu of a merchant to be presented via a first commerce channel. In at least one example, data associated with a menu of items offered for sale by the merchant 102 can be stored in a datastore. In at least one example, individual items can be associated with indicators indicating the commerce channel(s) through which such items are to be offered. In an example, an inventory can indicate which item(s) offered for sale by the merchant 102 are to be presented via an online menu. That is, such item(s) can be associated with an indicator or the like such that when an online menu is requested, the server(s) 106 can access such data to generate the online menu for presentation. In an example, the inventory can indicate which item(s) are not available online and are only available at a brick-and-mortar store. In some examples, the menu can include fulfillment options (e.g., pick-up, shipping, delivery, etc.). In at least one example, the server(s) 106 can access the data associated with the menu of items associated with an indicator indicating that they are available via a first commerce channel. In at least one example, the first commerce channel can be an ecommerce channel, wherein individual of the items are associated with different fulfillment options (e.g., pick-up, shipping, delivery, etc.).

Block 1104 illustrates receiving, from a computing device of a customer, a request to access the menu. In at least one example, a customer 110 can interact with a user interface of the customer computing device 118 to provide input that can be detected by a functional component of the customer computing device 118. In some examples, the input can be received via an interface associated with the first commerce channel (e.g., ecommerce user interface). In some examples, the input can be received via a progressive web application 120, or another source indicating that the request is associated with a different commerce channel (e.g., in-store).

Block 1106 illustrates determining whether the request is associated with the first commerce channel. In at least one example, the server(s) 106 can determine the source of the request. That is, the server(s) 106 can determine whether the request was sent from an ecommerce user interface (e.g., associated with the first commerce channel), the progressive web application 120 (e.g., associated with a different commerce channel), or the like. In at least one example, if the request is received from the first commerce channel, the server(s) 106 can access the menu associated with the first commerce channel and can cause the menu to be presented via the customer computing device 118, as illustrated in block 1108. That is, if the request is received from an ecommerce channel, the server(s) 106 can access an online menu associated with the ecommerce channel for presentation by the customer computing device 118 (e.g., via an ecommerce user interface).

Block 1110 illustrates modifying the menu for a second commerce channel. In at least one example, if the request was sent from a source, such as the progressive web application 120, in association with an indication that the request is associated with a designated seating area and/or brick-and-mortar store, the server(s) 106 can modify the online menu so that it is tailored to a dine-in experience. That is, fulfillment information and the like may not be relevant for dine-in customers and thus, the server(s) 106 can remove such information from the menu that would be presented via the first commerce channel. This can result in a simpler menu that can download faster and provide a better user experience for the customer 110 (e.g., the customer 110 does not need to provide selections for fulfillment, brick-and-mortar store locations, etc. because they are in the brick-and-mortar store). The server(s) 106 can cause the modified menu to be presented via the customer computing device 118, as illustrated in block 1112, for example, via the progressive web application 120 or via another user interface.

FIG. 12 illustrates an example environment 1200. The environment 1200 includes server(s) 1202 that can communicate over network(s) 1204 with user devices 1206 (which, in some examples can be merchant devices 1208 (individually, 1208(A)-1208(N))) and/or server(s) 1210 associated with third-party service provider(s). The server(s) 1202 can be associated with a service provider 1212 that can provide one or more services for the benefit of users 1214, as described below. Actions attributed to the service provider 1212 can be performed by the server(s) 1202.

In at least one example, the server(s) 1202 can correspond to the server(s) 106 of FIG. 1, the network(s) 1204 can correspond to the network(s) 108 of FIG. 1, the user devices 1206 can correspond to the merchant computing device 104 and/or the customer computing device 118, and the users 1214 can correspond to the merchant 102 and/or the customer 110 of FIG. 1. The merchant computing device 104 of FIG. 1 can correspond to one of the merchant devices 1208(A)-1208(N).

As described above, techniques described herein are directed to, among other things, customer-device application sites that are accessible via merchant-managed identifiers. The environment 1200 can facilitate such techniques. As described above, brick-and-mortar transactions can be high-friction transactions, such that customers and merchants can be required to interact with one another and other physical items (e.g., menus, writing utensils, payment terminals, etc.) to effectuate such transactions. There are scenarios where customers and/or merchants aim to expedite transactions and/or minimize friction associated with such transactions. Existing techniques (e.g., native applications, web applications, etc.) are not user-friendly and/or accessible for small merchants due to developmental complexity and costs.

As described above, the service provider 1212 can enable a merchant to provide a progressive web application to streamline transactions at brick-and-mortar stores. Progressive web applications offer solutions to the problems identified above with native applications and/or web applications. For example, progressive web applications use resources from modern web browsers to present an experience that is similar to a native application. Progressive web applications can provide more features and perform much faster than web applications. Further, progressive web applications can be portable across different types of platforms (e.g., desktop, mobile, etc.) and, in some examples, can fit on various display sizes (e.g., of desktop, mobile, tablet, etc. computing devices), thereby making progressive web applications accessible and user-friendly. That is, progressive web applications can be responsive in that they can fit different form factors and/or screen sizes. Progressive web applications can be more user-friendly than native applications and/or web applications. For example, progressive web applications can be accessible when an Internet connection is of poor quality and/or the computing devices are offline, be up-to-date (e.g., updates to content can be performed in the background), etc.

Progressive web applications can offer security by utilizing HTTPS protocol to protect the privacy and integrity of data associated with the progressive web applications. Progressive web applications can be "progressive" in that they can work for various users, regardless of which web browser is used. Further, progressive web applications, which can use an application shell model, provide a similar user experience as native applications. That is, customers can access progressive web applications via a web browser and/or a shortcut icon that can be installed on a desktop or home screen of computing devices operable by such customers. In some examples, progressive web applications can use push notifications to maintain engagement with customers. Moreover, progressive web applications can be shared easily via uniform resource locators (URLs) and do not require complex installation.

As such, techniques described herein, leverage progressive web applications to enable customers to have faster access to merchant data, via technology that provides an improved user experience over conventional alternatives, such as native applications and/or web applications. Such technology can therefore streamline transactions and other interactions between customers and merchants at brick-and-mortar stores or other establishments of such merchants.

The environment 1200 can include a plurality of user devices 1206, as described above. Each one of the plurality of user devices 1206 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1214. The users 1214 can be referred to as customers, buyers, merchants, sellers, borrowers, employees, employers, payors, payees, couriers and so on. The users 1214 can interact with the user devices 1206 via user interfaces presented via the user devices 1206. In at least one example, a user interface can be presented via a web browser, or the like. In other examples, a user interface can be presented via an application, such as a mobile application or desktop application, which can be provided by the service provider 1212 or which can be an otherwise dedicated application. In some examples, individual of the user devices 1206 can have an instance or versioned instance of an application, which can be downloaded from an application store, for example, which can present the user interface(s) described herein. In at least one example, a user 1214 can interact with the user interface via touch input, spoken input, or any other type of input.

As described above, in at least one example, the users 1214 can include merchants 1216 (individually, 1216(A)-1216(N)). In an example, the merchants 1216 can operate respective merchant devices 1208, which can be user devices 1206 configured for use by merchants 1216. For the purpose of this discussion, a "merchant" can be any entity that offers items (e.g., goods or services) for purchase or other means of acquisition (e.g., rent, borrow, barter, etc.). The merchants 1216 can offer items for purchase or other means of acquisition via brick-and-mortar stores, mobile stores (e.g., pop-up shops, food trucks, etc.), online stores, combinations of the foregoing, and so forth. In some examples, at least some of the merchants 1216 can be associated with a same entity but can have different merchant locations and/or can have franchise/franchisee relationships. In additional or alternative examples, the merchants 1216 can be different merchants. That is, in at least one example, the merchant 1216(A) is a different merchant than the merchant 1216(B) and/or the merchant 1216(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1208 can have an instance of a POS application 1218 stored thereon. The POS application 1218 can configure the merchant device 1208 as a POS terminal, which enables the merchant 1216(A) to interact with one or more customers 1220. As described above, the users 1214 can include customers, such as the customers 1220 shown as interacting with the merchant 1216(A). For the purpose of this discussion, a "customer" can be any entity that acquires items from merchants. While only two customers 1220 are illustrated in FIG. 12, any number of customers 1220 can interact with the merchants 1216. Further, while FIG. 12 illustrates the customers 1220 interacting with the merchant 1216(A), the customers 1220 can interact with any of the merchants 1216.

In at least one example, interactions between the customers 1220 and the merchants 1216 that involve the exchange of funds (from the customers 1220) for items (from the merchants 1216) can be referred to as and/or "transactions." In at least one example, the POS application 1218 can determine transaction data associated with the transactions. Transaction data can include payment information, which can be obtained from a reader device 1222 associated with the merchant device 1208(A), user authentication data, purchase amount information, point-of-purchase information (e.g., item(s) purchased, date of purchase, time of purchase, etc.), etc. The POS application 1218 can send transaction data to the server(s) 1202. Furthermore, the POS application 1218 can present a UI to enable the merchant 1216(A) to interact with the POS application 1218 and/or the service provider 1212 via the POS application 1218.

In at least one example, the merchant device 1208(A) can be a special-purpose computing device configured as a POS terminal (via the execution of the POS application 1218). In at least one example, the POS terminal may be connected to a reader device 1222, which is capable of accepting a variety of payment instruments, such as credit cards, debit cards, gift cards, short-range communication based payment instruments, and the like, as described below. In at least one example, the reader device 1222 can plug in to a port in the merchant device 1208(A), such as a microphone port, a headphone port, an audio-jack, a data port, or other suitable port. In additional or alternative examples, the reader device 1222 can be coupled to the merchant device 1208(A) via another wired or wireless connection, such as via a Bluetooth®, BLE, and so on. Additional details are described below with reference to FIG. 13. In some examples, the reader device 1222 can read information from alternative payment instruments including, but not limited to, wristbands and the like.

In some examples, the reader device 1222 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1222, and communicate with the server(s) 1202, which can provide, among other services, a payment processing service. The server(s) 1202 associated with the service provider 1212 can communicate with server(s) 1210, as described below. In this manner, the POS terminal and reader device 1222 may collectively process transaction(s) between the merchants 1216 and customers 1220. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to the customers 1220. In additional or alternative examples, the POS terminal can have a display integrated therein for presenting information to the customers 1220. POS systems, such as the POS system 1224, may be mobile, such that POS terminals and reader devices may process transactions in disparate locations across the world. POS systems can be used for processing card-present transactions and card-not-present (CNP) transactions, as described below.

A card-present transaction is a transaction where both a customer 1220 and his or her payment instrument are physically present at the time of the transaction. Card-present transactions may be processed by swipes, dips, taps, or any other interaction between a physical payment instrument (e.g., a card), or otherwise present payment instrument, and a reader device 1222 whereby the reader device 1222 is able to obtain payment data from the payment instrument. A swipe is a card-present transaction where a customer 1220 slides a card, or other payment instrument, having a magnetic strip through a reader device 1222 that captures payment data contained in the magnetic strip. A dip is a card-present transaction where a customer 1220 inserts a payment instrument having an embedded microchip (i.e., chip) into a reader device 1222 first. The dipped payment instrument remains in the payment reader until the reader device 1222 prompts the customer 1220 to remove the card, or other payment instrument. While the payment instrument is in the reader device 1222, the microchip can create a one-time code which is sent from the POS system 1224 to the server(s) 1210 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1220 may tap or hover his or her payment instrument (e.g., card, electronic device such as a smart phone running a payment application, etc.) over a reader device 1222 to complete a transaction via short-range communication (e.g., NFC, RFID, Bluetooth®, BLE, etc.). Short-range communication enables the payment instrument to exchange information with the reader device 1222. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1224, the server(s) 1202, and/or the server(s) 1210 may exchange payment information and transaction data to determine whether transactions are authorized. For example, the POS system 1224 may provide encrypted payment data, user authentication data, purchase amount information, point-of-purchase information, etc. (collectively, transaction data) to server(s) 1202 over the network(s) 1204. The server(s) 1202 may send the transaction data to the server(s) 1210. As described above, in at least one example, the server(s) 1210 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1210 associated therewith) can send a fund transfer request to a server computing device of a card payment network (e.g., Mastercard®, VISA®, etc.) to determine whether the transaction is authorized or deficient. In at least one example, the service provider 1212 can serve as an acquirer and connect directly with the card payment network.

The card payment network (e.g., the server(s) 1210 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1210 associated therewith) can make a determination as to whether the customer has the capacity to absorb the relevant charge associated with the payment transaction. In at least one example, the service provider 1212 can serve as an issuer and/or can partner with an issuer. The transaction is either approved or rejected by the issuer and/or the card payment network (e.g., the server(s) 1210 associated therewith), and a payment authorization message is communicated from the issuer to the POS device via a path opposite of that described above, or via an alternate path.

As described above, the server(s) 1210, which can be associated with payment service provider(s), may determine whether the transaction is authorized based on the transaction data, as well as information relating to parties to the transaction (e.g., the customer 1220 and/or the merchant 1216(A)). The server(s) 1210 may send an authorization notification over the network(s) 1204 to the server(s) 1202, which may send the authorization notification to the POS system 1224 over the network(s) 1204 to indicate whether the transaction is authorized. The server(s) 1202 may also transmit additional information such as transaction identifiers to the POS system 1224. In one example, the server(s) 1202 may include a merchant application and/or other functional components for communicating with the POS system 1224 and/or the server(s) 1210 to authorize or decline transactions.

Based on the authentication notification that is received by the POS system 1224 from server(s) 1202, the merchant 1216(A) may indicate to the customer 1220 whether the transaction has been approved. In some examples, approval may be indicated at the POS system 1224, for example, at a display of the POS system 1224. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1212 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1214 can access all of the services of the service provider 1212. In other examples, the users 1214 can have gradated access to the services, which can be based on risk tolerance, IDV outputs, subscriptions, and so on. In at least one example, access to such services can be availed to the merchants 1216 via the POS application 1218. In additional or alternative examples, each service can be associated with its own access point (e.g., application, web browser, etc.).

The service provider 1212 can offer payment processing services for processing payments on behalf of the merchants 1216, as described above. For example, the service provider 1212 can provision payment processing software, payment processing hardware and/or payment processing services to merchants 1216, as described above, to enable the merchants 1216 to receive payments from the customers 1220 when conducting Transactions with the customers 1220. For instance, the service provider 1212 can enable the merchants 1216 to receive cash payments, payment card payments, and/or electronic payments from customers 1220 for Transactions and the service provider 1212 can process transactions on behalf of the merchants 1216.

As the service provider 1212 processes transactions on behalf of the merchants 1216, the service provider 1212 can maintain accounts or balances for the merchants 1216 in one or more ledgers. For example, the service provider 1212 can analyze transaction data received for a transaction to determine an amount of funds owed to a merchant 1216(A) for the transaction. In at least one example, such an amount can be a total purchase price less fees charged by the service provider 1212 for providing the payment processing services. Based on determining the amount of funds owed to the merchant 1216(A), the service provider 1212 can deposit funds into an account of the merchant 1216(A). The account can have a stored balance, which can be managed by the service provider 1212. The account can be different from a conventional bank account at least because the stored balance is managed by a ledger of the service provider 1212 and the associated funds are accessible via various withdrawal channels including, but not limited to, scheduled deposit, same-day deposit, instant deposit, and a linked payment instrument.

A scheduled deposit can occur when the service provider 1212 transfers funds associated with a stored balance of the merchant 1216(A) to a bank account of the merchant 1216 (A) that is held at a bank or other financial institution (e.g., associated with the server(s) 1210). Scheduled deposits can occur at a prearranged time after a Transaction is funded, which can be a business day after the Transaction occurred, or sooner or later. In some examples, the merchant 1216(A) can access funds prior to a scheduled deposit. For instance, the merchant 1216(A) may have access to same-day deposits (e.g., wherein the service provider 1212 deposits funds from the stored balance to a linked bank account of the merchant on a same day as Transaction, in some examples prior to the Transaction being funded) or instant deposits (e.g., wherein the service provider 1212 deposits funds from the stored balance to a linked bank account of the merchant on demand, such as responsive to a request). Further, in at least one example, the merchant 1216(A) can have a payment instrument that is linked to the stored balance that enables the merchant to access the funds without first transferring the funds from the account managed by the service provider 1212 to the bank account of the merchant 1216(A).

In at least one example, the service provider 1212 may provide inventory management services. That is, the service provider 1212 may provide inventory tracking and reporting. Inventory management services may enable the merchant 1216(A) to access and manage a database storing data associated with a quantity of each item that the merchant 1216(A) has available (i.e., an inventory). Furthermore, in at least one example, the service provider 1212 can provide catalog management services to enable the merchant 1216 (A) to maintain a catalog, which can be a database storing data associated with items that the merchant 1216(A) has available for acquisition (i.e., catalog management services). In at least one example, the catalog may include a plurality of data items and a data item of the plurality of data items may represent an item that the merchant 1261(A) has available for acquisition. The service provider 1212 can offer recommendations related to pricing of the items, placement of items on the catalog, and multi-party fulfilment of the inventory.

In at least one example, the service provider 1212 can provide business banking services, which allow the merchant 1216(A) to track deposits (from payment processing and/or other sources of funds) into an account of the merchant 1216(A), payroll payments from the account (e.g., payments to employees of the merchant 1216(A)), payments to other merchants (e.g., business-to-business) directly from the account or from a linked debit card, withdrawals made via scheduled deposit and/or instant deposit, etc. Furthermore, the business banking services can enable the merchant 1216(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1216 to visualize their cash flow to track their financial health, set aside money for upcoming obligations (e.g., savings), organize money around goals, etc.

In at least one example, the service provider 1212 can provide financing services and products, such as via business loans, consumer loans, fixed term loans, flexible term loans, and the like. In at least one example, the service provider 1212 can utilize one or more risk signals to determine whether to extend financing offers and/or terms associated with such financing offers.

In at least one example, the service provider 1212 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1212 can offer different types of capital loan products. For instance, in at least one example, the service provider 1212 can offer a daily repayment loan product, wherein a capital loan is repaid daily, for instance, from a portion of transactions processed by the payment processing service on behalf of the borrower. Additionally and/or alternatively, the service provider 1212 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider 1212 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1216. The service provider 1212 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1212 (e.g., from payments owed to the merchant from payments processed on behalf of the merchant, funds transferred to the merchant, etc.). The service provider 1212 can offer specific financial products, such as payment instruments, tied specifically to the loan products. For example, in one implementation, the server provider 1212 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1212 can provide web-development services, which enable users 1214 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1216. In at least one example, the service provider 1212 can recommend and/or generate content items to supplement omni-channel presences of the merchants 1216. That is, if a merchant of the merchants 1216 has a web page, the service provider 1212—via the web-development or other services—can recommend and/or generate additional content items to be presented via other channel(s), such as social media, email, etc.

Furthermore, the service provider 1212 can provide payroll services to enable employers to pay employees for work performed on behalf of employers. In at least one example, the service provider 1212 can receive data that includes time worked by an employee (e.g., through imported timecards and/or POS interactions), sales made by the employee, gratuities received by the employee, and so forth. Based on such data, the service provider 1212 can make payroll payments to employee(s) on behalf of an employer via the payroll service. For instance, the service provider 1212 can facilitate the transfer of a total amount to be paid out for the payroll of an employee from the bank of the employer to the bank of the service provider 1212 to be used to make payroll payments. In at least one example, when the funds have been received at the bank of the service provider 1212, the service provider 1212 can pay the employee, such as by check or direct deposit, often a day, a week, or more after when the work was actually performed by the employee. In additional or alternative examples, the service provider 1212 can enable employee(s) to receive payments via same-day or instant deposit based at least in part on risk and/or reliability analyses performed by the service provider 1212.

Moreover, in at least one example, the service provider 1212 can provide employee management services for managing schedules of employees. Further, the service provider 1212 can provide appointment services for enabling users 1214 to set schedules for scheduling appointments and/or users 1214 to schedule appointments.

In some examples, the service provider 1212 can provide restaurant management services to enable users 1214 to make and/or manage reservations, to monitor front-of-house and/or back-of-house operations, and so on. In such examples, the merchant device(s) 1208 and/or server(s) 1202 can be configured to communicate with one or more other computing devices, which can be located in the front-of-house (e.g., POS device(s)) and/or back-of-house (e.g., kitchen display system(s) (KDS)). In at least one example, the service provider 1212 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1212 can provide fulfilment services, which can use couriers for delivery, wherein couriers can travel between multiple locations to provide delivery services, photography services, etc. Couriers can be users 1214 who can travel between locations to perform services for a requesting user 1214 (e.g., deliver items, capture images, etc.). In some examples, the courier can receive compensation from the service provider 1212. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1212 can receive requests for courier services, automatically assign the requests to active couriers, and communicate dispatch instructions to couriers via user interface (e.g., application, web browser, or other access point) presented via respective devices 1206.

In some examples, the service provider 1212 can provide omni-channel fulfillment services. For instance, if a customer places an order with a merchant and the merchant cannot fulfill the order because one or more items are out of stock or otherwise unavailable, the service provider 1212 can leverage other merchants and/or sales channels that are part of the platform of the service provider 1212 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 1212 can enable conversational commerce via conversational commerce services, which can use one or more machine learning mechanisms to analyze messages exchanged between two or more users 1214, voice inputs into a virtual assistant or the like, to determine intents of user(s) 1214. In some examples, the service provider 1212 can utilize determined intents to automate customer service, offer promotions, provide recommendations, or otherwise interact with customers in real-time. In at least one example, the service provider 1212 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 1212 can provide a peer-to-peer payment service that enables peer-to-peer payments between two or more users 1214. In at least one example, the service provider 1212 can communicate with instances of a payment application (or other access point) installed on devices 1206 configured for operation by users 1214. In an example, an instance of the payment application executing on a first device operated by a payor can send a request to the service provider 1212 to transfer an amount of funds (e.g., fiat currency or non-fiat currency such as cryptocurrency, securities, and related assets) from an account of the payor to an account of a payee (e.g., a peer-to-peer payment). The service provider 1212 can facilitate the transfer and can send a notification to an instance of the payment application executing on a second mobile device operated by the payee that the transfer is in process (or has been completed). In some examples, the service provider 1212 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1212 funds the request to payee on behalf of the payor, to speed up the transfer process and compensate for any lags that may be attributed to payor's financial network.

In some implementations, the service provider 1212 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1206.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1212. For instance, the service provider 1212 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1206 (e.g., mobile device or conventional personal computer (PC)) based on instructions transmitted to and from the server(s) 1202 (which, in such an example can be called a "messaging server"). In some instances, the messaging application can include a payment application with messaging capability that enables users of the payment application to communicate with one another. In such instances, the payment application can be executed on the a user device 1206 based on instructions transmitted to and from the server(s) 1202 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1212 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1214 may be new to the service provider 1212 such that the user 1214 that has not registered (e.g., subscribed to receive access to one or more services offered by the service provider) with the service provider 1212. The service provider 1212 can offer onboarding services for registering a potential user 1214 with the service provider 1212. In some examples, onboarding can involve presenting various questions, prompts, and the like to a potential user 1214 to obtain information that can be used to generate a profile for the potential user 1214. In at least one example, the service provider 1212 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1214 providing all necessary information, the potential user 1214 can be onboarded to the service provider 1212. In such an example, any limited or short-term access to services of the service provider 1212 can be transitioned to more permissive (e.g., less limited) or longer-term access to such services.

The service provider 1212 can be associated with IDV services, which can be used by the service provider 1212 for compliance purposes and/or can be offered as a service, for instance to third-party service providers (e.g., associated with the server(s) 1210). That is, the service provider 1212 can offer IDV services to verify the identity of users 1214 seeking to use or using their services. Identity verification requires a customer (or potential customer) to provide information that is used by compliance departments to prove that the information is associated with an identity of a real person or entity. In at least one example, the service provider 1212 can perform services for determining whether identifying information provided by a user 1214 accurately identifies the customer (or potential customer) (i.e., Is the customer who they say they are?).

The service provider 1212 is capable of providing additional or alternative services and the services described above are offered as a sampling of services. In at least one example, the service provider 1212 can exchange data with the server(s) 1210 associated with third-party service providers. Such third-party service providers can provide information that enables the service provider 1212 to provide services, such as those described above. In additional or alternative examples, such third-party service providers can access services of the service provider 1212. That is, in some examples, the third-party service providers can be subscribers, or otherwise access, services of the service provider 1212.

Techniques described herein can be configured to operate in both real-time/online and offline modes. "Online" modes refer to modes when devices are capable of communicating with the service provider 1212 (e.g., the server(s) 1202) and/or the server(s) 1210 via the network(s) 1204. In some examples, the merchant device(s) 1208 are not capable of connecting with the service provider 1212 (e.g., the server(s) 1202) and/or the server(s) 1210, due to a network connectivity issue, for example. In additional or alternative examples, the server(s) 1202 are not capable of communicating with the server(s) 1210 due to network connectivity issue, for example. In such examples, devices may operate in "offline" mode where at least some payment data is stored (e.g., on the merchant device(s) 1208) and/or the server(s) 1202 until connectivity is restored and the payment data can be transmitted to the server(s) 1202 and/or the server(s) 1210 for processing.

In at least one example, the service provider 1212 can be associated with a hub, such as an order hub, an inventory hub, a fulfillment hub and so on, which can enable integration with one or more additional service providers (e.g., associated with the additional server(s) 1210). In some examples, such additional service providers can offer additional or alternative services and the service provider 1212 can provide an interface or other computer-readable instructions to integrate functionality of the service provider 1212 into the one or more additional service providers.

Techniques described herein are directed to services provided via a distributed system of user devices 1206 that are in communication with one or more server computing devices (i.e., server(s) 1202) of the service provider 1212. That is, techniques described herein are directed to a specific implementation—or, a practical application—of utilizing a distributed system of user devices 1206 that are in communication with server(s) 1202 of the service provider 1212 to perform a variety of services, as described above. The unconventional configuration of the distributed system described herein enables the server(s) 1202 that are remotely-located from end-users (e.g., users 1214) to intelligently offer services based on aggregated data associated with the end-users, such as the users 1214 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1212, and those outside of the control of the service provider 1212, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

In at least one example, individual of the customers 1220 can interact with a customer computing device 1226, which can be one of the user device(s) 1226, and can correspond to the customer computing device 1226 described above with reference to FIG. 1. As described herein, in some examples, the customer computing device 1226 can download a progressive web application (PWA) 1228. As described above with reference to FIG. 1, in at least one example, the server(s) 1202 can receive an identification code and can send the progressive web application 1228 to the customer computing device 1226. That is, the customer computing device 1226 can download the progressive web application 1228 via a web browser 1230 of the customer computing device 1226. In some examples, the customer computing device 1226 can have previously downloaded the progressive web application 1228, for example by inputting a URL associated with the progressive web application 1228 into a web browser 1230 associated with the customer computing device 1226. In such examples, if the indication of the identification code may be associated with a cookie or other indicator indicating that the progressive web application 1228 was previously downloaded on the customer computing device 1226.

The progressive web application 1228, as described above, can be a type of application software delivered over a network (e.g., the web) that can be built using web technologies (e.g., HTML, CSS, JavaScript, etc.). The progressive web application 1228 can be used to provide user experiences similar to native applications on computing devices, such as the customer computing device 1226, with fewer development resources. The progressive web application 1228 can use resources from web browser(s), such as the web browser 1230, to present an experience that is similar to a native application. In at least one example, the progressive web application 1228 can utilize HTTPS protocol to protect the privacy and integrity of data associated with the progressive web application 1228 (e.g., data provided via the progressive web application 1228 and/or transmitted via the network(s) 1204). The progressive web application 1228 can be configured to work for various users, regardless of which web browser is used. Therefore, progressive web application 1228 can be progressive (having been built using progressive enhancement patterns) such that the progressive web application 1228 can work on ay device and enhance progressively, taking advantage of any features available on the customer computing device 1226 and the web browser 1230. In some examples, features available via the progressive web application 1228 can be dependent on web browser support. For example, features including independence from connectivity, installation to a home screen or desktop, push messaging, etc. can depend on web browser support.

As described above, the progressive web application 1228 can be more user-friendly than native applications and/or web applications. For example, the progressive web application 1228 can fit on various display sizes (e.g., of desktop, mobile, tablet, etc. computing devices), be accessible when an Internet connection is of poor quality and/or the computing devices are offline, be up-to-date (e.g., updates to content can be performed in the background), etc. Further, the progressive web application 1228, can be associated with a shell 1232, which can use an application shell model to provide a similar user experience as native applications. That is, a customer can access the progressive web application 1228 via a web browser and/or a shortcut icon that can be installed on a desktop or home screen of computing devices operable by such customers. In some examples, the progressive web application 1228 can use push notifications to maintain engagement with the customer. Moreover, the progressive web application 1228 can be shared easily via a uniform resource locator (URL) and does not require complex installation. That is, progressive web applications can use URLs to indicate current states of the progressive web applications, which can enable the progressive web applications to retain or reload its state when users bookmark or share a URL associated with a progressive web application (e.g., progressive web applications can be linkable).

In at least one example, the progressive web application 1228 can be associated with a manifest 1234, which provides developers a centralized place to store metadata associated with the progressive web application 1228. Such metadata can include, but is not limited to, the name of the progressive web application 1228, links to the progressive web application 1228 icons or image objects, preferred URL to launch or open the progressive web application 1228, the progressive web application 1228 configuration data, a default orientation of the progressive web application 1228, display mode options, and/or the like.

In at least one example, the progressive web application 1228 can be associated with an object 1236 (e.g., a "service worker") that is configured to execute client-side code in a background thread separate from a main thread of the web browser 1230 and provide a scriptable network proxy to the web browser 1230 to programmatically manage communication between the progressive web application 1228 and the server(s) 1202. In at least one example, the object can be independent of the progressive web application 1228 with which it is associated. In some examples, a portion of the progressive web application 1228 and/or content associated therewith can be cached (e.g., in a cache 1238) by the object 1236 for future interactions with the progressive web application 1228. That is, in some examples, after an initial loading of content, the same content and/or page elements need not be re-downloaded and/or re-rendered each time the progressive web application 1228 is subsequently accessed. In some examples, the object 1236 can utilize one or more application programming interfaces (APIs) to make the progressive web application 1228 work offline. Such APIs can provide a mechanism to retrieve content via the network(s) 1204 and a mechanism for a persistent content storage for application data). Caching resources can enable content to load faster under various network conditions.

In at least one example, the object 1236 can help keep content associated with the progressive web application 1228 up-to-date. In some examples, the object 1236 can be a file (e.g., JavaScript file) that operates as a type of web worker. The object 1236 can work separately from the main thread of the web browser 1230 to handle push notifications, synchronize data in the background, cache or retrieve resource requests, intercept network requests, receive centralized updates, and/or the like. Such an object 1230 can enable the progressive web application 1228 to provide the high performance and rich user experience of native applications, with low storage space, real-time updates, and improved search engine visibility of traditional web applications (e.g., progressive web applications, as websites, can be discoverable in search engines).

In some examples, the object 1230 can utilize one or more other APIs 1240 to enable the progressive web application 1228 to work like a native application. For example, the object can use a notifications API to display and interact with notifications using a native notification system of an operating system of the customer computing device 1226. A push API can enable the progressive web application 1228 to subscribe to a push service and receive push messages, for example, from the server(s) 106. Push messages can be delivered to the object 1236, which can use the information in the message to update the local state or display a notification to the customer. Because the object 1236 runs independently of the progressive web application 1228, it can receive and display notifications even when the web browser is not running. In some examples, a background sync API can defer actions until the customer computing device 1226 has stable connectivity. This can be useful to ensure that whatever the customer wants to send is actually sent. This API can also allow the server(s) 1202 to push periodic updates to the progressive web application 1228 so the progressive web application 1228 can update when it is next online. In some examples, a channel messaging API can enable the object 1236 to communicate with other objects and with the progressive web application 1228. Examples of this API can include new content notification (e.g., making new content available via the progressive web application 1228) and updates that utilize user interaction. The progressive web application 1228 can utilize additional or alternative APIs, or additional or alternative functional components, to perform operations as described herein.

In at least one example, the object 1236 can go through a three-step lifecycle of registration, installation, and activation. Registration can involve communicating the location of the object 1236 to the web browser 1230 in preparation for installation. Installation can occur when there is no object installed in the web browser 1230, or if there is an update to the object 1236 (e.g., a byte difference between a new object and a previously installed object). Activation can occur when all of the web pages of the progressive web application 1228 are closed, so that there is no conflict between the previous version and the updated one. The lifecycle also helps maintain consistency when switching among versions of the object 1236 since, in some examples, only a single object can be active for a domain.

In at least one example, the progressive web application 1228 can cause merchant data to be presented via the web browser 1230 of the customer computing device 1226. In some examples, such merchant data can be a menu of items, a layout of the brick-and-mortar store of the merchant, or the like. In some examples, a customer can interact with the customer computing device 1226 (e.g., a user interface associated therewith) to provide an input, an indication of which can be transmitted to the server(s) 1202 and/or a merchant computing device, such as the merchant computing device 1208(A). In at least one example, the server(s) 1202 and/or the merchant computing device 1208(A) can perform an operation based on such input. Examples are provided above.

The merchant computing device 1208(A) and the customer computing device 1226 can be associated with additional or alternative components, as described below with reference to FIG. 13. The components illustrated in FIG. 12 are for illustrative purposes and components described below with reference to FIG. 13 omitted for clarity of FIG. 12.

FIG. 13 depicts an illustrative block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 12. For example, in the environment 100 described above, the merchant computing device 104 and the customer computing device 118 can each represent a user device 1302.

As described above, in at least one example, the user device 1302 can correspond to the merchant computing device 104 or the customer computing device 118 of FIG. 1. In at least one example, the server(s) 1304 can correspond to the server(s) 106 of FIG. 1 and the network(s) 1306 can correspond to the network(s) 108 of FIG. 1.

As described above, techniques described herein are directed to, among other things, customer-device application sites that are accessible via merchant-managed identifiers. The system 1300 can facilitate such techniques. As described above, brick-and-mortar transactions can be high-friction transactions, such that customers and merchants can be required to interact with one another and other physical items (e.g., menus, writing utensils, payment terminals, etc.) to effectuate such transactions. There are scenarios where customers and/or merchants aim to expedite transactions and/or minimize friction associated with such transactions. Existing techniques (e.g., native applications, web applications, etc.) are not user-friendly and/or accessible for small merchants due to developmental complexity and costs.

As described above, the service provider 1212, described above with reference to FIG. 12, can enable a merchant to provide a progressive web application to streamline transactions at brick-and-mortar stores. Progressive web applications offer solutions to the problems identified above with native applications and/or web applications. For example, progressive web applications use resources from modern web browsers to present an experience that is similar to a native application. Progressive web applications can provide more features and perform much faster than web applications. Further, progressive web applications can be portable across different types of platforms (e.g., desktop, mobile, etc.), and, in some examples, can fit on various display sizes (e.g., of desktop, mobile, tablet, etc. computing devices), thereby making progressive web applications accessible and user-friendly. That is, progressive web applications can be responsive in that they can fit different form factors and/or screen sizes. Progressive web applications can be more user-friendly than native applications and/or web applications. For example, progressive web applications can be accessible when an Internet connection is of poor quality and/or the computing devices are offline, be up-to-date (e.g., updates to content can be performed in the background), etc.

Progressive web applications can offer security by utilizing HTTPS protocol to protect the privacy and integrity of data associated with the progressive web applications. Progressive web applications can be "progressive" in that they can work for various users, regardless of which web browser is used. Further, progressive web applications, which can use an application shell model, provide a similar user experience as native applications. That is, customers can access progressive web applications via a web browser and/or a shortcut icon that can be installed on a desktop or home screen of computing devices operable by such customers. In some examples, progressive web applications can use push notifications to maintain engagement with customers. Moreover, progressive web applications can be shared easily via uniform resource locators (URLs) and do not require complex installation.

As such, techniques described herein, leverage progressive web applications to enable customers to have faster access to merchant data, via technology that provides an improved user experience over conventional alternatives, such as native applications and/or web applications. Such technology can therefore streamline transactions and other interactions between customers and merchants at brick-and-mortar stores or other establishments of such merchants.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, modules or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can enable a user interface 1320 to be presented so that users can interact with the user device 1302, and thus the server(s) 1304 and/or other networked devices. In at least one example, the user interface 1320 can be presented via a web browser, or the like. In other examples, the user interface 1320 can be presented via an application, such as a mobile application or desktop application, which can be provided by a service provider 1212 associated with the server(s) 1304, or which can be an otherwise dedicated application. In some examples, the user interface 1320 can be presented via a web browser associated with a progressive web application, such as the progressive web application 120 described above with reference to FIG. 1 and the progressive web application described above with reference to FIG. 12. In at least one example, a user can interact with the user interface via touch input, spoken input, gesture, or any other type of input. The word "input" is also used to describe "contextual" input that may not be directly provided by the user via the user interface 1320. For example, user's interactions with the user interface 1320 are analyzed using, e.g., natural language processing techniques, to determine context or intent of the user, which may be treated in a manner similar to "direct" user input.

In some examples, if the user device 1302 represents the merchant computing device 104 of FIG. 1, the user interface 1320 can be presented via an application provided by the service provider 1212 of FIG. 12. The application, referred to in FIG. 12 as the POS application 1218, which can configure the user device 1302 as a POS terminal. Such an application can additionally or alternatively enable a merchant to view and/or manage an order queue, view and/or manage reservations, generate and/or manage identification codes, and the like. That is, such an application can configure the user device 1302 to perform the functionality described herein (e.g., in FIGS. 1 and 4-6, above). In some examples, at least some of the functionality can be availed via a web browser presenting the user interface 1320. In examples where the user device 1302 represents the customer computing device 118 of FIG. 1, the user interface 1320 can be presented via a web browser associated with the progressive web application 120. Additional details associated with such a web browser and progressive web application are described above with reference to FIG. 12.

Depending on the type of the user device 1302, the computer-readable media 1310 can also optionally include other functional components and data, such as other modules and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1212, described above, to provide one or more services. That is, in some examples, the service provider 1212 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1214 and/or for sending users 1214 notifications regarding available appointments with merchant(s) located proximate to the users 1214. In at least one example, location can be used for taking payments from nearby customers when they leave a geofence, or location can be used to initiate an action responsive to users 1214 enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with other objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the service provider and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more modules and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one module for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 136, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program modules, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider 1212 and/or payment processing service. Functional components stored in the computer-readable media 1330 can optionally include a merchant component 1336, an identification component 1338, a training component 1340, and one or more other components and data 1342.

The merchant component 1336 can be configured to receive transaction data from POS systems, such as the POS system 1224 described above with reference to FIG. 12. The merchant component 1336 can transmit requests (e.g., authorization, capture, settlement, etc.) to payment service server computing device(s) to facilitate transactions between merchants and customers. The merchant component 1336 can communicate the successes or failures of the transactions to the POS systems and/or customer computing devices. In some examples, the merchant component 1336 can receive orders, generate open tickets, manage open tickets, and the like. In at least one example, the merchant component 1336 can manage orders, for example, by managing the order queue described above and/or transmitting communications associated with such orders to customer computing devices, merchant computing devices, kitchen display systems, front-of-house computing systems, back-of-house computing systems, or the like. The merchant component 1336 can provide functionality for managing reservations, feedback, and/or any other server-side merchant-related functionality described above with reference to FIGS. 2A-2D, 3A-3C, 4, 5, and 7-11.

The identification component 1338 can facilitate the generation of identification codes as described herein. That is, the identification component 1338 can receive identifiers associated with physical locations (e.g., designated seating areas, brick-and-mortar stores, etc.), and can generate identification codes based at least in part on such identifiers. In some examples, the identification component 1338 can facilitate the association of existing identification codes with physical locations. That is, the identification component 1338 can perform the server-side operations described above with reference to FIG. 6, for example.

The training component 1340 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1302 and/or the server(s) 1304 for use at a time after the data models have been trained (e.g., at runtime).

The one or more other components and data 1342 can include programs, drivers, etc., and the data used or generated by the functional components. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Components are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). In additional and/or alternative examples, the component(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1344 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1346 that can be configured to store data that is accessible, manageable, and updatable. In some examples, the datastore 1346 can be integrated with the user device 1302 and/or the server(s) 1304. In other examples, as shown in FIG. 13, the datastore 1346 can be located remotely from the server(s) 1304 and can be accessible to the server(s) 1304. The datastore 1346 can comprise multiple databases and/or servers connected locally and/or remotely via the network(s) 1306.

In at least one example, the datastore 1346 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 1212.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1346 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1346 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "May," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1, 12, and 13 for convenience and ease of understanding. However, the methods illustrated are not limited to being performed using components described in FIGS. 1, 12, and 13, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

A. A method, implemented by at least one server computing device of a service provider, the method comprising: accessing identifications associated with (i) a brick-and-mortar store of a merchant associated with the service provider and (ii) a designated seating area within the brick-and-mortar store; generating an identification code based at least in part on the identifications, wherein the identification code is configured to be positioned in proximity to the designated seating area at the brick-and-mortar store; receiving an indication of the identification code from a computing device of a customer in the designated seating area at the brick-and-mortar store; causing a progressive web application to be downloaded onto the computing device of the customer via a web browser of the computing device of the customer, wherein: the progressive web application is associated with an object that (i) is configured to execute client-side code in a background thread separate from a main thread of the web browser of the computing device of the customer and (ii) provides a scriptable network proxy to the web browser to programmatically manage communication between the progressive web application and the at least one server computing device of the service provider; at least a portion of the progressive web application is cached by the object for future interactions with the progressive web application; and the progressive web application causes a menu of items offered for sale by the merchant to be presented via the web browser; receiving, from the computing device of the customer and via an input received by the progressive web application, an order for an item of the menu of items, wherein the order is associated with the identification of the brick-and-mortar store and the identification of the designated seating area; receiving payment data associated with a payment instrument of the customer; and processing payment for at least the order based at least in part on the payment data.

B. The method as paragraph A recites, wherein the indication of the identification code is associated with a customer identifier, the method further comprising: accessing customer data associated with the customer identifier; and generating the menu of items based at least in part on the customer data.

C. The method as paragraph A or B recites, wherein the payment data is received while the customer is at the brick-and-mortar store or after the customer has left the brick-and-mortar store.

D. The method as any of claims A-C recites, wherein the order is a first order, the item is a first item, and the first order is associated with a first time, the method further comprising receiving, via another input received by the progressive web application and at a second time after the first time, a second order for a second item of the menu of items, wherein the web browser remains open between the first time and the second time.

E. The method as any of claims A-D recites, wherein the order is associated with a first time, the method further comprising receiving, via another input received by the progressive web application and at a second time after the first time, at least one of gratuity or feedback associated with at least the order, wherein the web browser remains open between the first time and the second time.

F. The method as any of claims A-E recites, further comprising receiving, from a computing device of the merchant and prior to generating the identification, an indication that the designated seating area has been added to the brick-and-mortar store, wherein generating the identification code is further based at least in part on receiving the indication.

G. A system comprising: one or more processors; and one or more computer-readable media storing instructions that, when executed by the one or more processors, cause the system to: associate an identification of a physical location associated with a merchant with an identification code; receive the identification code from a computing device of a customer; cause, based at least in part on receiving the identification code, merchant data associated with the merchant to be presented via a web browser of the computing device of the customer, wherein the merchant data is presented via the web browser by a progressive web application downloaded onto the computing device of the customer via the web browser; receive, from the computing device of the customer, an indication of an input received via the progressive web application; and perform an operation based at least in part on the input.

H. The system as paragraph G recites, wherein the identification code comprises at least one of a barcode, a Quick Response (QR) code, or a unique identifier of a Radio-Frequency Identification (RFID) device.

I. The system as paragraph G or H recites, wherein the physical location comprises at least one of a brick-and-mortar store of the merchant or a designated seating area at the brick-and-mortar store, the instructions, when executed by the one or more processors, further cause the system to generate the identification code based at least in part on at least one of (i) an identification of the brick-and-mortar store or (ii) an identification of the designated seating area, wherein the identification code is configured to be positioned in proximity to the designated seating area at the brick-and-mortar store.

J. The system as any of claims G-I recites, wherein the input is associated with a transaction and the instructions, when executed by the one or more processors, further cause the system to: receive payment data associated with a payment instrument of the customer, wherein the payment data is received prior to, at a beginning of, during, at an end of, or after the transaction, and wherein the payment data is received via (i) the computing device of the customer via the progressive web application, (ii) a computing device of the merchant via a merchant application installed thereon, or (iii) a datastore storing the payment data; and process payment for the transaction based at least in part on the payment data.

K. The system as paragraph J recites wherein, prior to the merchant data, being presented via the web browser by the progressive web application, at least a portion of the merchant data is presented via an instant application.

L. The system as any of claims G-K recites, wherein the indication of the identification code is associated with a customer identifier, the instructions, when executed by the one or more processors, further cause the system to: access customer data associated with the customer identifier; and determine at least one of the merchant data or a recommendation associated with the merchant data based at least in part on the customer data.

M. The system as any of claims G-L recites, wherein the merchant data comprises a menu of items available for sale by the merchant and the input comprises an order for an item.

N. The system as paragraph M recites, wherein the input is associated with a first time, the instructions, when executed by the one or more processors, further cause the system to receive, from the computing device of the customer, another indication of another input received by the progressive web application and at a second time, wherein the other input comprises at least one of another order for another item, a reservation, gratuity, or feedback, wherein the web browser remains open between the first time and the second time.

O. The system as any of claims G-N recites, wherein the merchant data comprises a layout of a brick-and-mortar store of the merchant and the input comprises a request for a designated seating area associated with the brick-and-mortar store.

P. The system as any of claims G-O recites, wherein the progressive web application is associated with an object that (i) is configured to execute client-side code in a background thread separate from a main thread of the web browser of the computing device of the customer and (ii) provides a scriptable network proxy to the web browser to programmatically manage communication between the progressive web application and at least one server computing device of a service provider, and wherein at least a portion of the progressive web application is cached by the object for future interactions with the progressive web application.

Q. One or more computer-readable media storing instructions that, when executed by one or more processors, cause the one or more processors to perform operations comprising: associating an identification of a physical location associated with a merchant with an identification code of an identification instrument; receiving, from a computing device of a customer, the identification code of the identification instrument; causing, based at least in part on receiving the identification code of the identification instrument, a menu of items for sale by the merchant to be presented via a web browser of the computing device of the customer, wherein the menu of items is presented via the web browser by a progressive web application downloaded onto the computing device of the customer via the web browser; receiving, from the computing device of the customer and at a first time via an indication of a first input received by the progressive web application, a first order for a first item from the menu of items; receiving payment data associated with a payment instrument of the customer; and processing payment for at least the first item based at least in part on the payment data.

R. The one or more computer-readable media as paragraph Q recites, the operations further comprising: associating the first item with a data structure representing an open ticket; receiving, from the computing device of the customer and at a second time via a second input received by the progressive web application, a second order for a second item from the menu of items, wherein the second time is after the first time; associating the second item with the data structure; and processing payment for the first item and the second item at a third time after the first time and the second time.

S. The one or more computer-readable media as paragraph Q or R recites, the operations further comprising: receiving, from a computing device of the merchant, a second order associated with a different customer, wherein the second order is received via (i) an online ordering user interface or (ii) an application associated with the computing device of the merchant; adding the second order to a queue that includes the first order; and causing at least a portion of the queue to be presented via at least one of the computing device of the customer or the computing device of the merchant.

T. The one or more computer-readable media as any of claims Q-S recites, the operations further comprising: based at least in part on receiving the identification code, access data associated with an online menu presented via an online ordering user interface; and modifying the data associated with the online menu to generate the menu of items to be presented via the web browser by the progressive web application.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented by at least one server computing device of a service provider, the method comprising:

Accessing (i) a first identifier associated with a brick-and-mortar store of a merchant associated with the service provider and (ii) a second identifier associated with a designated physical area within the brick-and-mortar store;

causing presentation, on a computing device associated with the brick-and-mortar store, of a user interface that includes an actuation mechanism configured to, when actuated, facilitate generation of a third identifier based at least in part on the first identifier and the second identifier, receiving an indication of actuation of the actuation mechanism;

generating the third identifier, wherein the third identifier is a physical item to be positioned proximate to the designated physical area and includes an identification code scannable by a computing device of a customer;

receiving an indication of the third identifier from the computing device of the customer in the designated physical area at the brick-and-mortar store;

causing a menu of items offered for sale by the merchant to be presented via the computing device of the customer;

receiving, from the computing device of the customer an indication of an order for an item of the menu of items, wherein the order is associated with the third identifier;

receiving payment data associated with a payment instrument of the customer; and processing payment for at least the order based at least in part on the payment data.

2. The method as claim 1 recites, further comprising causing a progressive web application to be download onto the computing device of the customer via a web browser of the computing device of the customer and wherein the progressive web application causes the menu of items offered for sale by the merchant to be presented via the web browser.

3. The method as claim 2 recites, wherein the order is associated with a first time, the method further comprising receiving, from the computing device of the customer at a second time after the first time, an indication of at least one of gratuity or feedback associated with at least the order, wherein the web browser remains open between the first time and the second time.

4. The method as claim 2 recites, wherein the order is a first order, the item is a first item, and the first order is associated with a first time, the method further comprising receiving, from the computing device of the customer at a second time after the first time, a second order for a second item of the menu of items, wherein the web browser remains open between the first time and the second time.

5. The method as claim 1 recites, wherein the indication of the third identifier is associated with a customer profile, the method further comprising:

accessing customer data associated with the customer profile; and based at least in part on the customer profile, generating a customer specific menu of items for presentation via the computing device of the customer.

6. The method as claim 1 recites, wherein the payment data is received while the customer is at the brick-and-mortar store or after the customer has left the brick-and-mortar store.

7. The method as claim 1 recites, further comprising receiving, from a computing device of the merchant and prior to generating the identification code, an indication that the designated physical area is a seating area that has been added to the brick-and-mortar store, wherein generating the third identifier is further based at least in part on receiving the indication that the seating area has been added.

8. The method as claim 1 recites, wherein the third identifier comprises at least one of a barcode, a Quick Response (QR) code, or a unique identifier of a Radio-Frequency Identification (RFID) device.

9. A system comprising:

one or more processors; and one or more computer-readable media storing instructions that, when executed by the one or more processors, cause the one or more processors to perform operations comprising:

accessing (i) a first identifier associated with a brick-and-mortar store of a merchant associated with a service provider and (ii) a second identifier associated with a designated physical area within the brick-and-mortar store;

causing presentation, on a computing device associated with the brick-and-mortar store, of a user interface that includes an actuation mechanism configured to, when actuated, facilitate generation of a third identifier based at least in part on the first identifier and the second identifier;

receiving an indication of actuation of the actuation mechanism;

generating the third identifier, wherein the third identifier is a physical item to be positioned proximate to the designated physical area and includes an identification code scannable by a computing device of a customer;

receiving an indication of the third identifier from the computing device of the customer in the designated physical area at the brick-and-mortar store;

causing a menu of items offered for sale by the merchant to be presented via the computing device of the customer;

receiving, from the computing device of the customer an indication of an order for an item of the menu of items, wherein the order is associated with the third identifier;

receiving payment data associated with a payment instrument of the customer; and processing payment for at least the order based at least in part on the payment data.

10. The system as claim 9 recites, the operations further comprising causing a progressive web application to be download onto the computing device of the customer via a web browser of the computing device of the customer and wherein the progressive web application causes the menu of items offered for sale by the merchant to be presented via the web browser.

11. The system as claim 10 recites, wherein the order is associated with a first time, the operations further comprising receiving, from the computing device of the customer at a second time after the first time, an indication of at least one of gratuity or feedback associated with at least the order, wherein the web browser remains open between the first time and the second time.

12. The system as claim 10 recites, wherein the order is a first order, the item is a first item, and the first order is associated with a first time, the operations further comprising receiving, from the computing device of the customer at a second time after the first time, a second order for a second item of the menu of items, wherein the web browser remains open between the first time and the second time.

13. The system as claim 10 recites, wherein the indication of the third identifier is associated with a customer profile, the operations further comprising:

accessing customer data associated with the customer profile; and based at least in part on the customer profile, generating a customer specific menu of items for presentation via the computing device of the customer.

14. The system as claim 9 recites, wherein the payment data is received while the customer is at the brick-and-mortar store or after the customer has left the brick-and-mortar store.

15. The system as claim 9 recites, the operations further comprising receiving, from a computing device of the merchant and prior to generating the identification code, an indication that the designated physical area is a seating area that has been added to the brick-and-mortar store, wherein generating the third identifier is further based at least in part on receiving the indication that the seating area has been added.

16. The system as claim 9 recites, wherein the third identifier comprises at least one of a barcode, a Quick Response (QR) code, or a unique identifier of a Radio-Frequency Identification (RFID) device.

17. One or more non-transitory computer-readable media storing instructions that, when executed by one or more processors, cause the one or more processors to perform operations comprising:

Accessing (i) a first identifier associated with a brick-and-mortar store of a merchant associated with a service provider and (ii) a second identifier associated with a designated physical area within the brick-and-mortar store;

causing presentation, on a computing device associated with the brick-and-mortar store, of a user interface that includes an actuation mechanism configured to, when actuated, facilitate generation of a third identifier based at least in part on the first identifier and the second identifier;

receiving an indication of actuation of the actuation mechanism;

generating the third identifier, wherein the third identifier is a physical item to be positioned proximate to the designated physical area and includes an identification code scannable by a computing device of a customer;

receiving an indication of the third identifier from the computing device of the customer in the designated physical area at the brick-and-mortar store;

causing a menu of items offered for sale by the merchant to be presented via the computing device of the customer;

receiving from the computing device of the customer an indication of an order for an item of the menu of items, wherein the order is associated with the third identifier;

receiving payment data associated with a payment instrument of the customer; and processing payment for at least the order based at least in part on the payment data.

18. The one or more non-transitory computer-readable media as claim 17 recites, the operations further comprising causing a progressive web application to be download onto the computing device of the customer via a web browser of the computing device of the customer and wherein the progressive web application causes the menu of items offered for sale by the merchant to be presented via the web browser.

19. The one or more non-transitory computer-readable media as claim 18 recites, wherein the order is associated with a first time, the operations further comprising receiving, from the computing device of the customer at a second time after the first time, an indication of at least one of gratuity or feedback associated with at least the order, wherein the web browser remains open between the first time and the second time.

20. The one or more non-transitory computer-readable media as claim 18 recites, wherein the indication of the third identifier is associated with a customer profile, the operations further comprising:

accessing customer data associated with the customer profile; and based at least in part on the customer profile, generating a customer specific menu of items for presentation via the computing device of the customer.

* * * * *